United States Patent
Hibino et al.

(10) Patent No.: US 7,729,295 B2
(45) Date of Patent: Jun. 1, 2010

(54) CONNECTION MODE SETTING APPARATUS, CONNECTION MODE SETTING METHOD, CONNECTION MODE CONTROL APPARATUS, CONNECTION MODE CONTROL METHOD AND SO ON

(75) Inventors: Yoshihiko Hibino, Hashima-gun (JP); Yuji Kiyohara, Nagoya (JP); Hiroaki Suzuki, Nagoya (JP); Kentaro Ushiyama, Nagoya (JP); Koichi Iijima, Higashikurume (JP)

(73) Assignees: Brother Kogyo Kabushiki Kaisha, Nagoya (JP); Xing Inc., Nagoya (JP)

( * ) Notice: Subject to any disclaimer, the term of this patent is extended or adjusted under 35 U.S.C. 154(b) by 598 days.

(21) Appl. No.: 11/656,985

(22) Filed: Jan. 24, 2007

(65) Prior Publication Data

US 2007/0116050 A1 May 24, 2007

Related U.S. Application Data

(63) Continuation-in-part of application No. PCT/JP2005/010764, filed on Jun. 13, 2005.

(30) Foreign Application Priority Data

Jul. 26, 2004 (JP) ............................. 2004-217032

(51) Int. Cl.
*H04L 12/28* (2006.01)
*H04J 3/16* (2006.01)
(52) U.S. Cl. ....................................... 370/256; 370/468
(58) Field of Classification Search ................ 370/256, 370/468
See application file for complete search history.

(56) References Cited

U.S. PATENT DOCUMENTS

| 7,171,491 | B1 * | 1/2007 | O'Toole et al. | 709/244 |
|---|---|---|---|---|
| 7,246,172 | B2 * | 7/2007 | Yoshiba et al. | 709/233 |
| 2002/0131422 | A1 * | 9/2002 | Chu et al. | 370/397 |
| 2003/0101253 | A1 | 5/2003 | Saito et al. | |
| 2003/0115340 | A1 | 6/2003 | Sagula et al. | |
| 2003/0158856 | A1 * | 8/2003 | Nishigaya et al. | 707/102 |

(Continued)

FOREIGN PATENT DOCUMENTS

EP  1 211 851 A1  6/2002

(Continued)

OTHER PUBLICATIONS

K. Sebayashi et al., "ATM Multicast Communication Methods With Multiple QoS Guarantee", NTT R&D, vol. 46, No. 3 (1997) pp. 191-198, Oct. 3, 1997.

(Continued)

*Primary Examiner*—Andrew Lee
(74) *Attorney, Agent, or Firm*—Oliff & Berridge, PLC

(57) ABSTRACT

The apparatus includes effective bandwidth information obtaining means for obtaining effective bandwidth information indicative of an effective bandwidth of each of the communication paths attached to the receiving devices so that each of the receiving devices is connected to the receiving device or the distributing device at the higher hierarchical level; effective bandwidth comparing means for comparing the effective bandwidths of the communication paths; and connection mode setting means for setting a mode of connection among the devices on the basis of a result of comparison of the effective bandwidth comparing means.

34 Claims, 17 Drawing Sheets

U.S. PATENT DOCUMENTS

| | | | |
|---|---|---|---|
| 2003/0223372 A1* | 12/2003 | Sanchez et al. | 370/237 |
| 2004/0216044 A1* | 10/2004 | Martin et al. | 715/526 |
| 2005/0152289 A1* | 7/2005 | Nagata et al. | 370/256 |
| 2006/0218301 A1* | 9/2006 | O'Toole et al. | 709/244 |
| 2007/0071031 A1* | 3/2007 | Shin et al. | 370/468 |
| 2008/0063003 A1* | 3/2008 | O'Neal | 370/408 |

FOREIGN PATENT DOCUMENTS

| | | |
|---|---|---|
| JP | A-11-177596 | 7/1999 |
| JP | A-2003-169089 | 6/2003 |

OTHER PUBLICATIONS

"The Spanning Tree Algorithm and Protocol", ANSI/IEEE Std 802.1 D, (1998) pp. 58-109, 12: 1998.

Nov. 13, 2009 Search Report issued in European Patent Application No. 05748962.7.

Nachum Shacham et al., "Admission Control Algorithms for Multicast Sessions with Multiple Streams", IEEE Journal on Selected Areas in Communications, vol. 15, No. 3, (Apr. 1997).

* cited by examiner

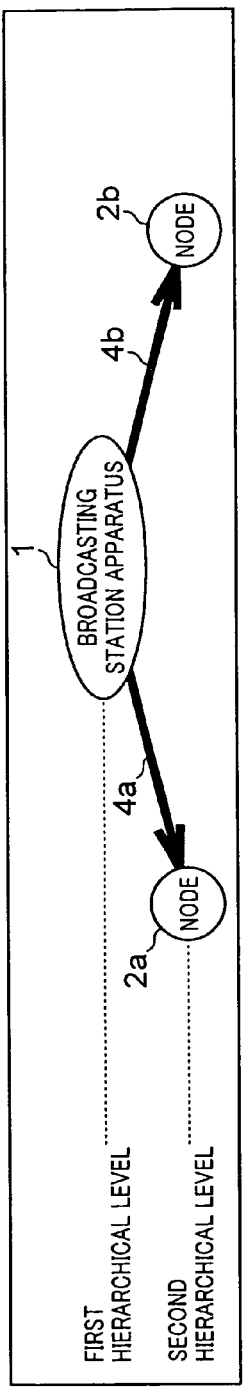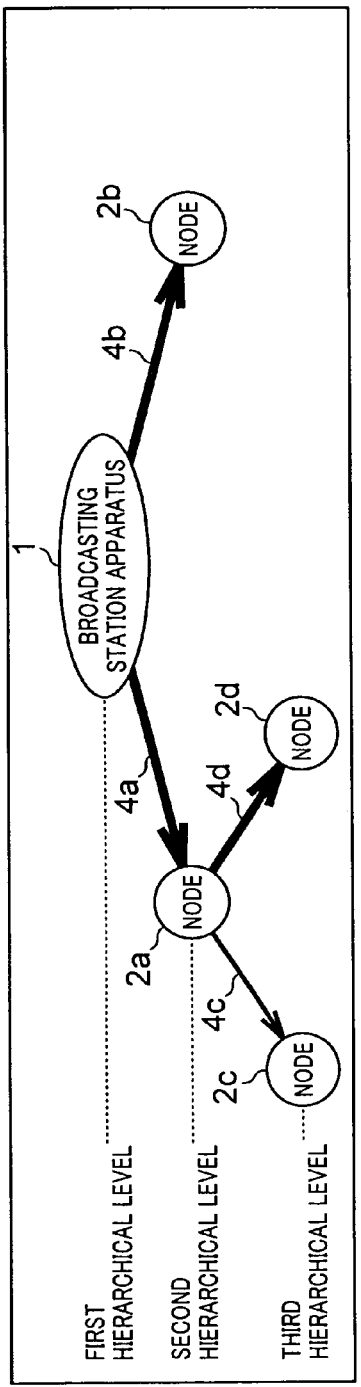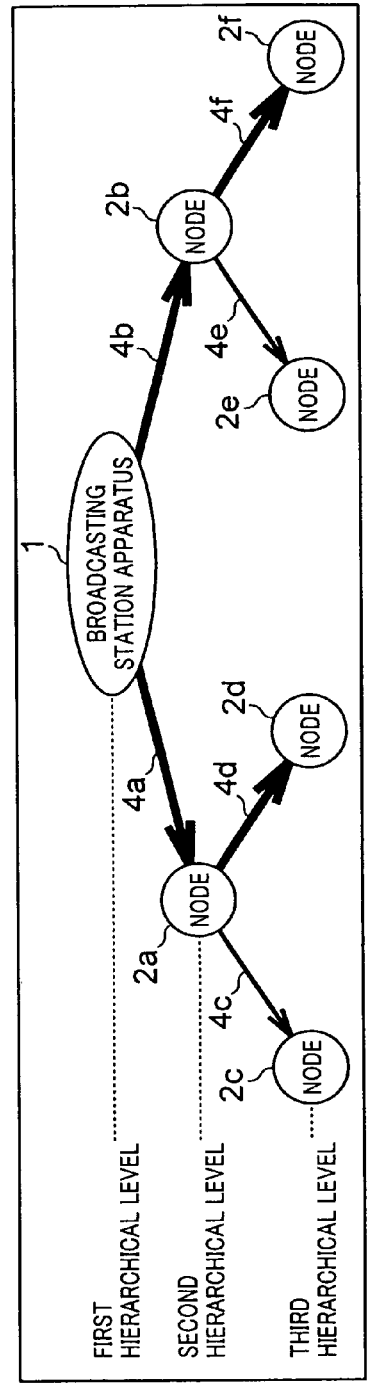

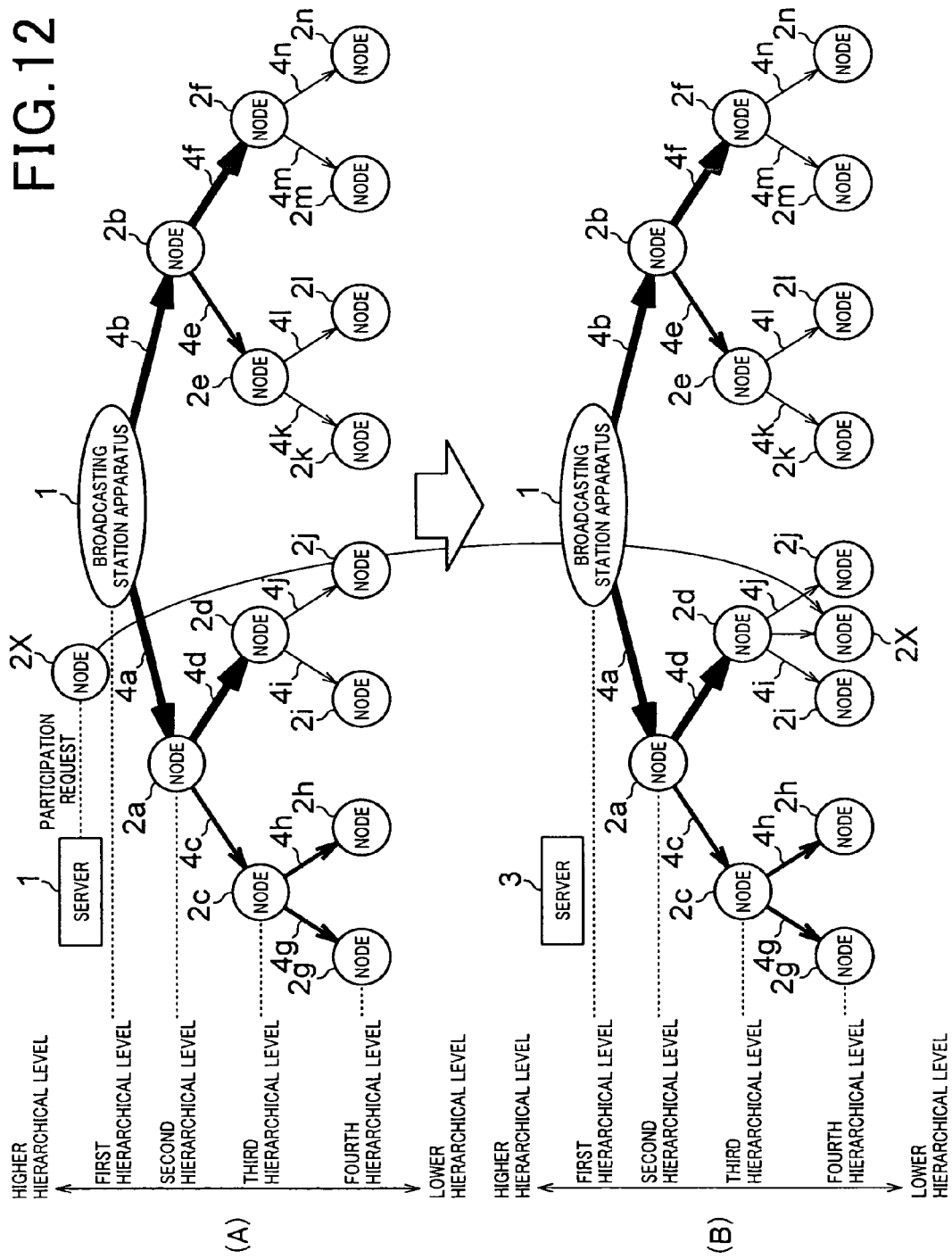

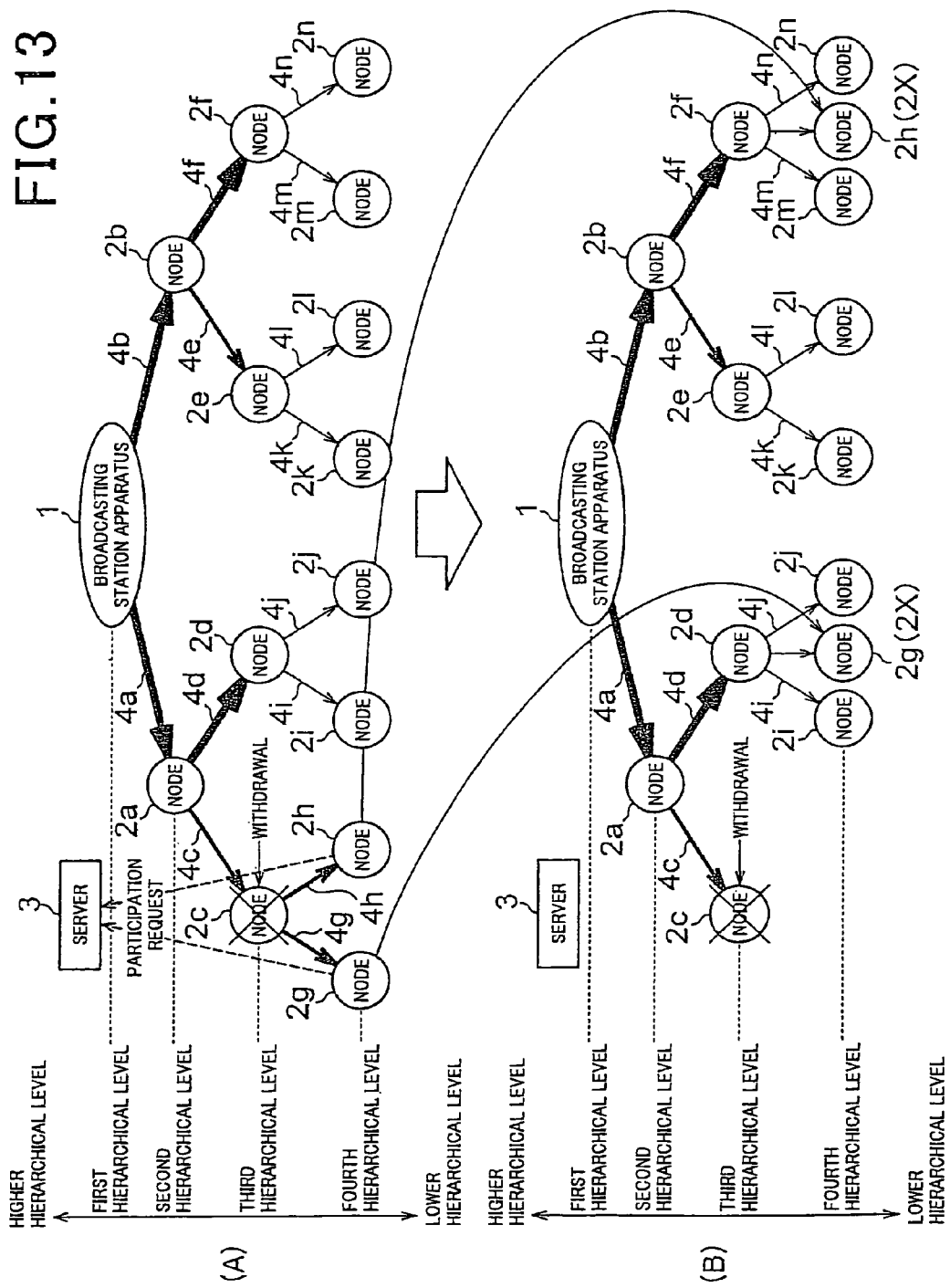

CONNECTION MODE SETTING APPARATUS, CONNECTION MODE SETTING METHOD, CONNECTION MODE CONTROL APPARATUS, CONNECTION MODE CONTROL METHOD AND SO ON

This is a Continuation-in-Part of International Application No. PCT/JP2005/010764 filed Jun. 13, 2005, which claims the benefit of Japanese Patent Application No. 2004-217032 filed Jul. 26, 2004. The disclosure of the prior applications is hereby incorporated by reference herein in its entirety.

BACKGROUND OF THE INVENTION

1. Field of the Invention

The present invention relates to a technical field of an apparatus and method for setting or controlling a connection mode among devices in a peer-to-peer (P2P) type contents data (or stream data) distribution system.

2. Discussion of the Related Art

In recent years, attention is being paid to a peer-to-peer type contents data distribution system in a communication network such as the Internet. The contents data distribution system transmits/receives stream-distributed contents data among nodes as clients in a manner different from a client-server type contents data distribution system.

As a system of this kind, for example, Patent Document 1 discloses a stream data distribution system. In the system, each node has topology information for recognizing a network connection relation. Each node is connected to a node on the upper stream (at a higher hierarchical level) recognized from the topology information, receives stream data transmitted from the upstream node, and transfers (relays) the stream data to a node on the downstream (at a lower hierarchical level). Patent Document 1; Japanese Patent Application Laid-Open No. 2003-169089

SUMMARY OF THE INVENTION

Assume that, in a contents data distribution system of this kind, for example, communication on the network is disconnected due to withdrawal of another node positioned at a higher hierarchical level from the system while a node is receiving (downloading) contents data. In this case, the node receiving the contents data performs so-called resume operation of searching for another connectable node and re-connecting to the node. However, if the node is connected to a node attached to a communication line (communication path) having a narrow bandwidth as an upper device as a destination of re-connection, an adverse influence is exerted on reproduction of contents data after re-connection, and further, on reproduction of contents data of a low-order device. For this reason, there has been a problem such that an adverse influence is exerted on the whole system. Consequently, it is demanded to select a node having a wide bandwidth as a high-order device as a destination of re-connection.

However, a conventional contents data distribution system is constructed without considering the type of a communication line connecting nodes and the bandwidth such as data transfer speed (contents data supply capability) over a wide range of the system. Irrespective of the fact that a device having sufficiently wide bandwidth accompanying a node exists, there is not means for clarifying the existence, so that the re-joined node is re-connected to a node attached to a relatively narrow bandwidth and there is the possibility that an adverse influence is exerted on reproduction of contents data after the reconnection.

The present invention has been achieved in consideration of the problems and the like, and an object of the invention is to provide a connection mode setting apparatus, a connection mode setting method, a connection mode control apparatus, a connection mode control method, and the like realizing shorter time of fining an optimum connection destination at the time of connection for participation/withdrawal to/from the system since network topology itself constructing the system clearly shows that the bandwidths of paths attached to nodes constructing the system are wide at the high hierarchical level and narrow at the low hierarchical level, and capable of improving communication performance over a wide range of the system without exerting an adverse influence on the whole system even in the case where resume operation or the like accompanying reproduction of contents data after connection is performed.

To solve the problems, according to one aspect of the invention, there is provided a connection mode setting apparatus for setting a mode of connection among a distributing device for distributing distribution information and a plurality of receiving devices for receiving the distribution information provided in a tree type distribution system in which the distributing device is positioned at the highest hierarchical level, the plurality of receiving devices are formed at a plurality of hierarchical levels, the devices are connected in a tree shape via communication paths, and the distribution information distributed by the distributing device is sequentially transferred from the receiving device at the high hierarchical level to the receiving device at the low hierarchical level, the apparatus including: effective bandwidth information obtaining means for obtaining effective bandwidth information indicative of an effective bandwidth of each of the communication paths attached to the receiving devices so that each of the receiving devices is connected to the receiving device or the distributing device at the higher hierarchical level; effective bandwidth comparing means for comparing the effective bandwidths of the communication paths; and connection mode setting means for setting a mode of connection among the devices on the basis of a result of comparison of the effective bandwidth comparing means.

BRIEF DESCRIPTION OF THE DRAWINGS

FIG. 6A is a diagram showing bandwidths of communication lines in a communication path 4a attached to a node 2a, and FIG. 6B is a diagram showing an effective bandwidth of the communication path 4a attached to the node 2a.

FIGS. 11A to 11C are a diagram showing a state where the connection mode of the node 2 and the like is set.

FIG. 12 is a diagram showing a state where the connection mode of the node 2 and the like is reset when an unparticipating node 2X newly participates in the tree distribution system S.

FIG. 13 is a diagram showing a state where the connection mode of the node 2 and the like is reset when the node 2 positioned at a high hierarchical level withdraws from the tree distribution system S.

Figure 1:
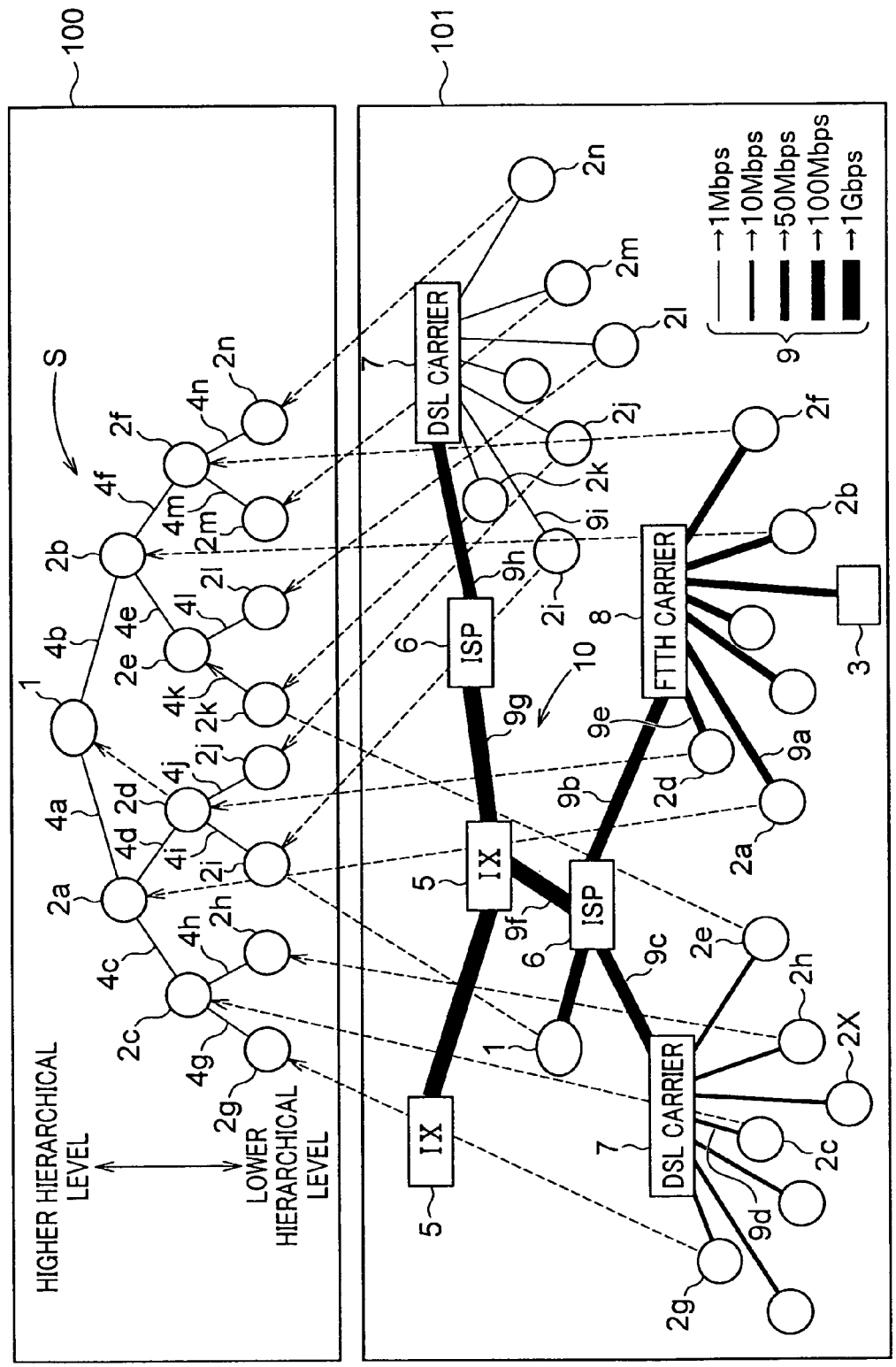
FIG. 1 is a diagram showing an example of a connection mode of devices in a tree-type distribution system according to an embodiment of the present invention.

DESCRIPTION OF REFERENCE NUMERALS 1 broadcasting station apparatus
2 node
3 system management server
4 communication path
10 network
11 controller
12 storage
13 encoder
14 communication unit
15 bus
21 controller
22 storage
23 buffer memory
24 decoder
25 video processor
26 display
27 sound processor
28 speaker
29 communication unit
30 bus
31 controller
32 storage
33 communication unit
34 bus
S tree distribution system

DETAILED DESCRIPTION OF THE PREFERRED EMBODIMENTS

Preferred embodiments of the present invention will be described hereinbelow with reference to the drawings. In the following embodiment, the present invention is applied to a tree distribution system.

[1. Configuration and the Like of Tree Type Distribution System]

First, referring to FIG. 1, a schematic configuration and the like of a tree type distribution system will be described.

FIG. 1 is a diagram showing an example of connection modes of nodes in a tree-type distribution system according to the embodiment. In the example of FIG. 1, in an upper frame 100, electric connection modes among nodes in a tree type distribution system S (for example, a connection relation of establishment of communication between a node and another node) are shown. In a lower frame 101, physical connection modes among devices including nodes in the tree type distribution system S are shown.

The tree type distribution system S is a peer-to-peer (P2P) network system including, as shown in FIG. 1, a broadcasting station apparatus 1 as an example of a distributing apparatus for distributing contents data (stream data) as distribution information, and a plurality of nodes (peers) 2a, 2b, 2c, ..., and 2n as an example of a plurality of receiving devices for receiving the contents data. The nodes 2a to 2n provided for the tree type distribution system S are called nodes participating the tree type distribution system S. On the other hand, a node 2X (hereinbelow, called "unparticipating node 2X") in the lower frame 101 in FIG. 1 is a node which does not participate in the tree type distribution system at present, but can participate in the tree type distribution system and become a node in response to a request for participation in the tree type distribution system S. In FIG. 1, the nodes 2a to 2n participating in the tree type distribution system S can withdraw from the tree type distribution system S.

The broadcasting station apparatus 1 and the plurality of nodes 2 are physically connected to a network 10 constructed by an Internet exchange (IX) 5, an Internet service provider (ISP) 6, (an apparatus of) a digital subscriber line (DSL) carrier 7, (an apparatus of) Fiber To The Home (FTTH) carrier 8, a communication line (such as telephone line or optical cable) 9, and the like. To each of the broadcasting station apparatus 1 and the nodes 2, the peculiar ID and an Internet protocol (IP) address are assigned. In the lower frame 101 in FIG. 1, the thickness of the solid line corresponding to each of the communication lines 9 expresses the bandwidth (for example, data transfer speed) of each of the communication lines 9.

On condition of physical connection as shown in the lower frame 101, in the tree type distribution system S, as show in the upper frame 100 in FIG. 1, the broadcasting station apparatus 1 is at the top of the hierarchy, a plurality of levels are formed by the plurality of nodes 2a to 2n and, an overlay network is configured in a tree shape via a plurality of communication paths 4a, 4b, 4c, ..., and 4n on the basis of the IP addresses. Contents data distributed by the broadcasting station apparatus 1 is sequentially transferred from the node 2a at the high level or the like to the node 2g at the low level or the like. In the following description, in the case of referring to any of the nodes 2a to 2n, it may be called as the node 2 for convenience. In the case of referring to any of the communication paths 4a to 4n, it maybe called the communication path 4 for convenience.

The node 2 participating in the tree type distribution system S can receive distributed or transferred contents data. However, in the case where the node 2 withdraws from the tree type distribution system S, the node 2 cannot receive the contents data.

In the embodiment, the case where setting, control, management, and the like of the connection mode among the nodes in the tree type distribution system S shown in the upper frame 100 in FIG. 1 are performed by a system management server 3 as an example of a connection mode setting apparatus and a connection mode control apparatus will be mainly described. However, as will be described later, the invention is not limited to the case.

[2. Configuration and the Like of Broadcasting Station Apparatus]

Figure 2:
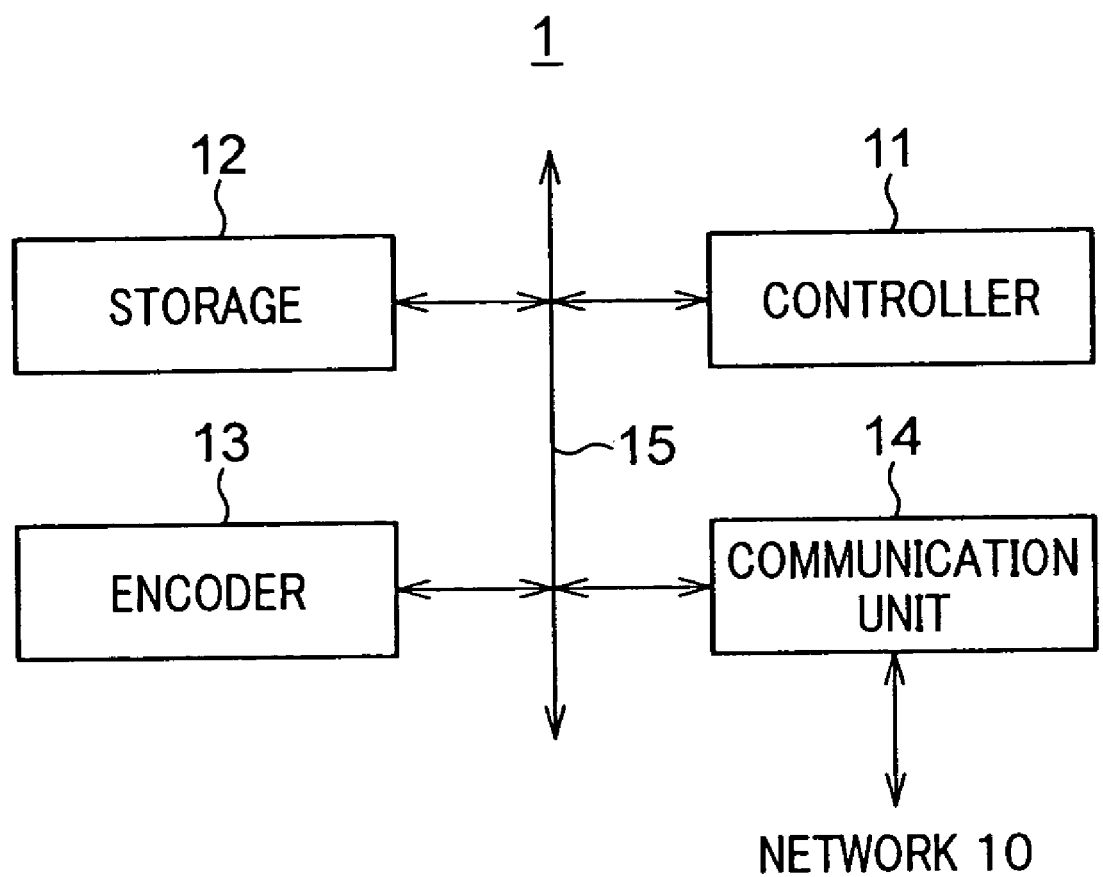
FIG. 2 is a diagram showing an example of a schematic configuration of a broadcasting station apparatus 1.

Referring now to FIG. 2 and the like, the configuration and function of the broadcasting station apparatus 1 will be described.

FIG. 2 is a diagram showing an example of a schematic configuration of the broadcasting station apparatus 1.

As shown in FIG. 2, the broadcasting station apparatus 1 has a controller 11 as a computer constructed by a central processing unit (CPU) having a computing function, a random-access memory (RAM) for work, a read-only memory (ROM) for storing various data and programs, and the like, a storage 12 constructed by a hard disc drive (HDD) or the like for storing various data, tables, programs, contents data, and the like, an encoder 13 for encoding (data-compressing, ciphering, or the like) video data (image information), audio data (sound information), and the like included in the contents data, and a communication unit 14 for performing communication control with the node 2 via the network 10. The elements are connected to each other via a bus 15.

When the CPU in the controller 11 executes a program stored in the storage 12 or the like, the controller 11 reads the contents data stored in the storage 12, causes the encoder 13 to encode the video data, audio data, and the like included in the contents data, and distributes the encoded data to the nodes 2 (in the example, the nodes 2a and 2b in the upper frame 100 in FIG. 1) via the communication unit 14.

The controller 11 determines the destination of the contents data with reference to a connection mode table stored in the storage 12. In the connection mode table, at least, the IP address of the node 2 connected to the broadcasting station apparatus 1 (in other words, the node 2 as a destination of the contents data) is written. For example, the contents data is packetized by the controller 11, the IP address of the destination or the like is added to the header of each packet, and the resultant data is transmitted from the communication unit 14.

[3. Configuration and the Like of Node]

The configuration and the function of the node 2 will now be described with reference to FIG. 3 and the like.

Figure 3:
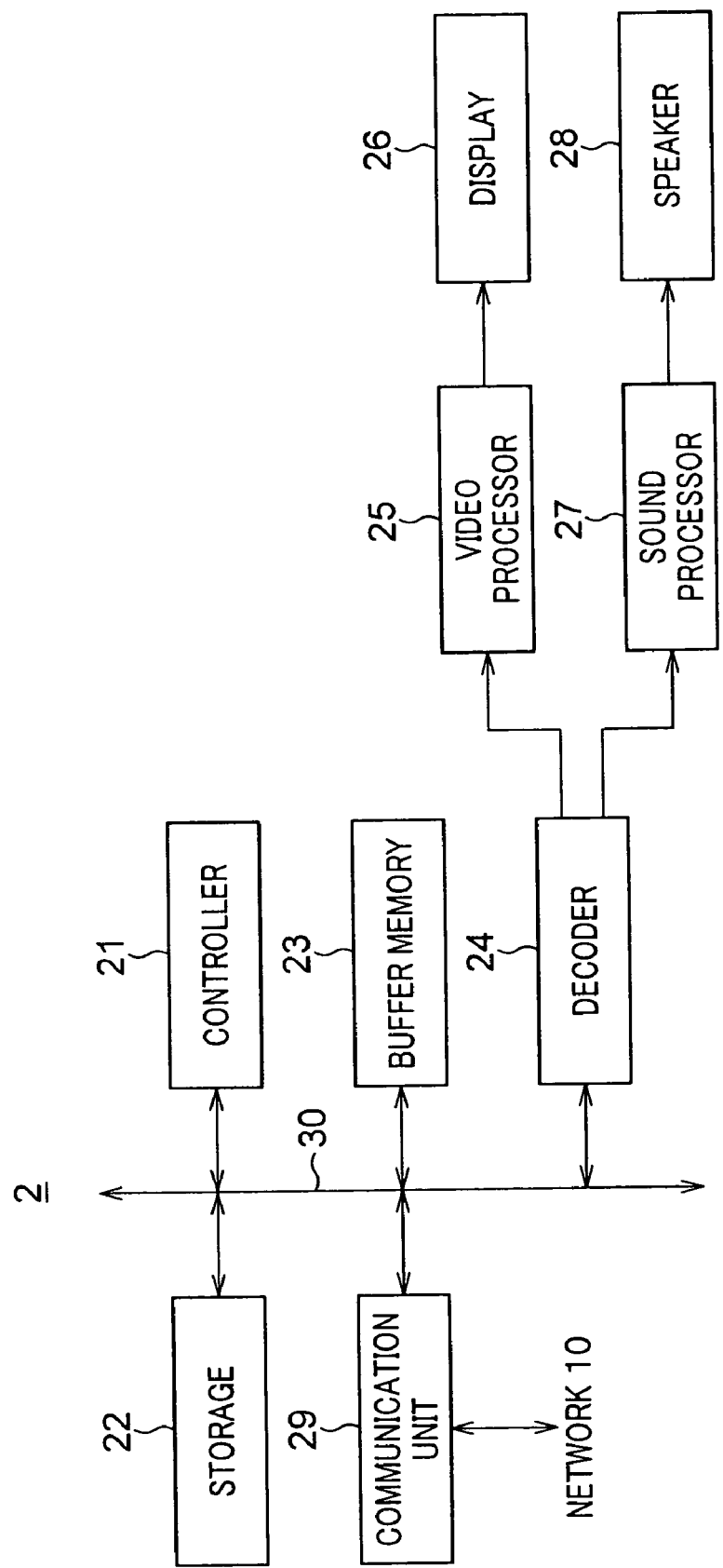
FIG. 3 is a diagram showing an example of a schematic configuration of a node 2.

FIG. 3 is a diagram showing an example of the schematic configuration of the node 2.

As shown in FIG. 3, each of the nodes 2 includes a controller 21 as a computer constructed by a CPU having a computing function, a RAM for work, a ROM for storing various data and programs, and the like, a storage 22 constructed by an HDD or the like for storing various data, tables, programs, and the like, a buffer memory 23 for temporarily storing received contents data, a decoder 24 for decoding the encoded video data, audio data, and the like included in the contents data, a video processor 25 for performing a predetermined drawing process on the decoded video data and the like to output the resultant data as a video signal, a display 26 such as a CRT or a liquid crystal display for displaying a video image on the basis of the video signal output from the video processor 25, a sound processor 27 for D/A (digital-to-analog) converting the decoded audio data to an analog audio signal and amplifying the analog audio signal by an amplifier, a speaker 28 for outputting the audio signal output from the sound processor 27 as an sound wave; and a communication unit 29 for performing communication control with the broadcasting station apparatus 1 or another node 2 via the network 10. The controller 21, storage 22, buffer memory 23, decoder 24, and communication path 29 are connected to each other via a bus 30.

When the CPU in the controller 21 executes a program stored in the storage 22 or the like, the controller 21 receives the contents data distributed from the broadcasting station apparatus 1 or transferred from the node 2 connected at a higher level (in the example of FIG. 1, a node at a level higher than the node 2c in the upper frame 100 is the node 2a) via the communication unit 29, reads the contents data from the buffer memory 23 while storing it in the buffer memory 23, causes the decoder 24 to decode the video data, audio data, and the like included in the contents data, outputs the video data or the like to the video processor 25 and outputs the audio data to the sound processor 27. Further, the controller 21 transfers the received contents data to the node 2 at a low level (in the example of FIG. 1, a node at a lower level of the node 2b in the upper frame 100 is nodes 2e and 2f) via the communication unit 29. The contents data is sequentially transferred to the nodes 2g to 2n at the lowest level.

Like the controller 21, the controller 21 determines the destination of the contents data with reference to the connection mode table stored in the storage 22.

In the connection mode table, at least, the IP address of a node 2 connected to the node 2 (in other words, the node 2 to which the contents data is transferred) is written. The contents data is packetized by the controller 21, the IP address of the destination or the like is added to the header of each packet, and the resultant data is transmitted from the communication unit 29.

For example, all or part of the decoder 24, video processor 25, display 26, sound processor 27, and speaker 28 do not have to be provided for the node 2 but may be provided for another apparatus (for example, a television receiver, a personal computer, or the like) connected to the node 2 via a coaxial cable, a local area network (LAN) cable, or the like.

The unparticipating node 2X as a new receiver to participate the tree type distribution system S transmits participation request information indicative of a request for participating the tree type distribution system S to the system management server 3 via the network 10, and can obtain the connection mode table as connection information necessary for connection to the node 2 from the system management server 3. The unparticipating node 2X can participate as a new node 2 in the tree type distribution system S by connecting the node 2 as an upper node on the basis of the IP address described in the connection mode table.

[4. Configuration and the Like of System Management Server]

Figure 4:
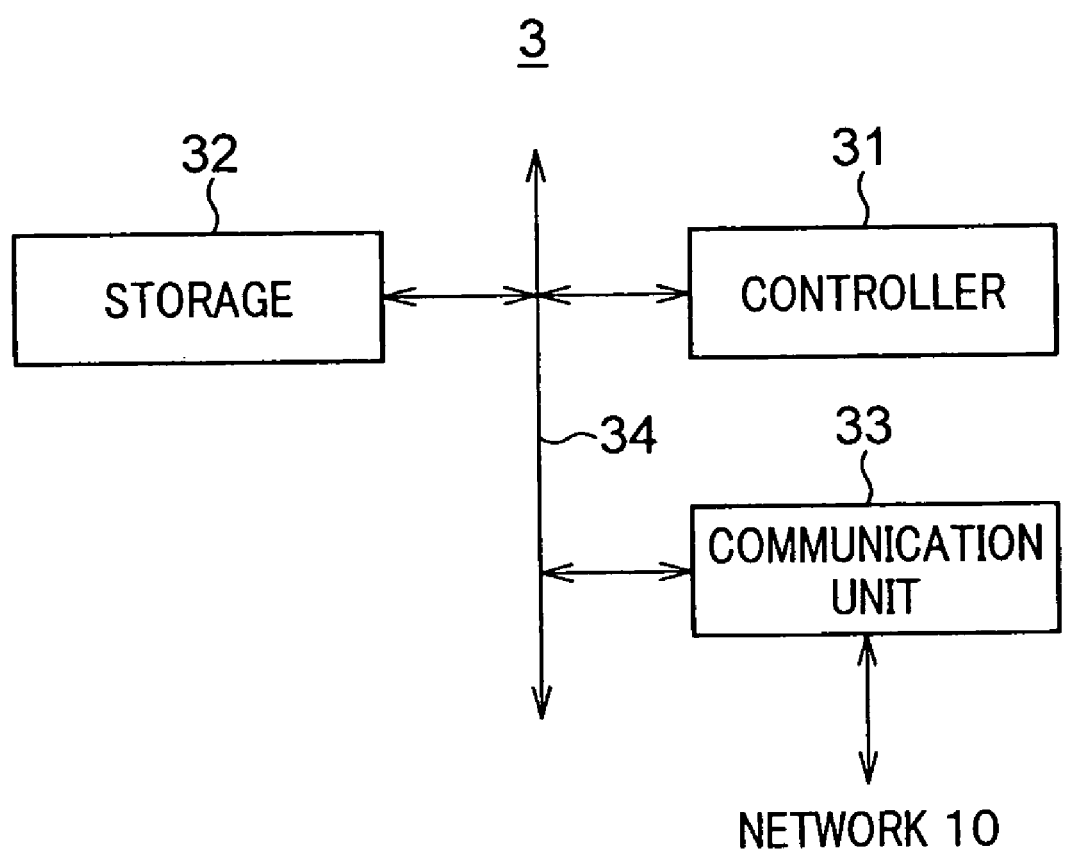
FIG. 4 is a diagram showing an example of a schematic configuration of a system management server 3.

Referring now to FIG. 4 and the like, the configuration and function of the system management server 3 will be described.

FIG. 4 is a diagram showing an example of a schematic configuration of the system management server 3.

As shown in FIG. 4, the system management server 3 has a controller 31 as a computer constructed by a CPU having a computing function, a RAM for work, a ROM for storing various data and programs, a storage 32 constructed by an HDD or the like for storing various data, tables, and programs (including the connection mode setting program and the connection mode control program of the invention), and a communication unit 33 for performing communication control with the broadcasting station apparatus 1 and the node 2 via the network 10. The elements are connected to each other via a bus 34. The connection mode setting program and the connection mode control program may be downloaded from a predetermined server on the network 10 or may be recorded on a recording medium such as a CD-ROM and read via a drive of the recording medium.

The CPU in the controller 31 executes the connection mode setting program and the connection mode control program stored in the storage 32 or the like. Consequently, while controlling the elements of the system management server 3, the controller 31 functions as effective bandwidth information obtaining means, effective bandwidth comparing means, connection mode setting means (connection destination setting means), participation request information receiving means, and connection information transmitting means of the present invention.

The functions of the effective bandwidth information obtaining means, effective bandwidth comparing means, connection mode setting means (connection destination setting means), connection determining means, participation request information receiving means, and connection information transmitting means executed by the controller 31 will be concretely described below.

After the broadcasting station apparatus 1 and the plurality of nodes 2 to participate the tree type distribution system S are designated (for example, by entry of the IDs of the apparatus and the nodes by the operator or the like), the controller 31 obtains the effective bandwidth information indicative of the effective bandwidth of each of the communication paths provided for the nodes 2, and the like from topology management policy (which is stored in, for example, a predetermined address in the RAM) so that a node 2 is connected to another node 2 at a higher level (that is, the node 2 positioned at the immediately higher level) as the effective bandwidth information obtaining means.

In the example in the upper frame 100 in FIG. 1, for example, the communication path 4a is a communication path provided for connecting the node 2a to the broadcasting station apparatus 1. The communication path 4c is a communication path provided for connecting the node 2c to the node 2a at the higher level. There is a case that the communication path 4 is formed by connecting a plurality of communication lines 9 of various bandwidths (which are different from each other). For example, the communication path 4c provided for the node 2c is formed by connecting communication lines 9a to 9d.

Figure 5A:
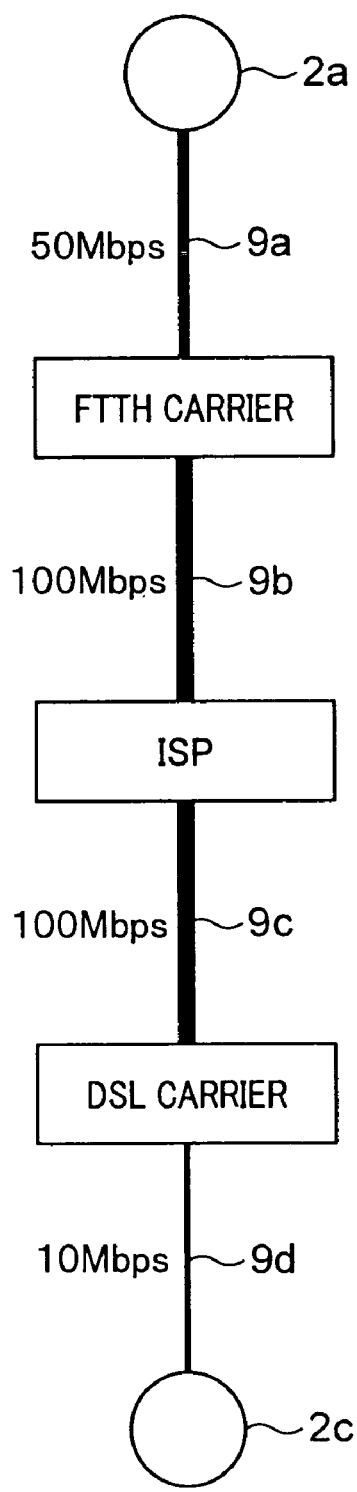
FIG. 5A is a diagram showing bandwidths of communication lines in a communication path 4c attached to a node 2c.
Figure 5B:
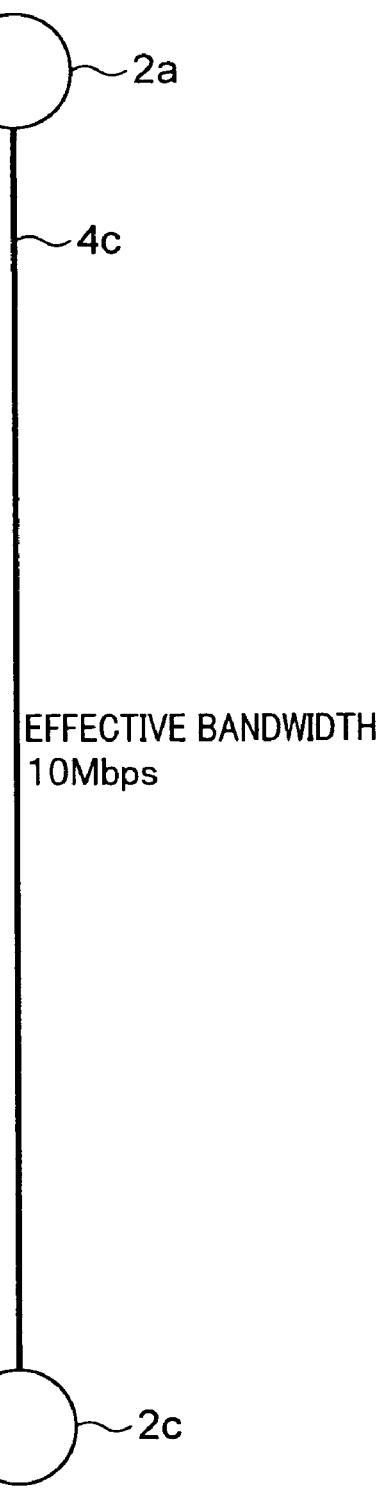
FIG. 5B is a diagram showing an effective bandwidth of the communication path 4c attached to the node 2c.

FIG. 5A is a diagram showing bandwidths of communication lines in the communication path 4c provided for the node 2c. FIG. 5B is a diagram showing the effective bandwidth of the communication path 4c provided for the node 2c. As shown in FIG. 5A, the bandwidth of each of the communication lines 9b and 9c is 100 Mbps, the bandwidth of the communication line 9a is 50 Mbps, and the bandwidth of the communication line 9d is 10 Mbps. However, since the bandwidth of the communication line 9d is only 10 Mbps, the communication line 9d is the bottleneck. As a result, the bandwidth of the communication line 4c is limited, and the effective bandwidth is 10 Mbps as shown in FIG. 5B.

Figure 6A:
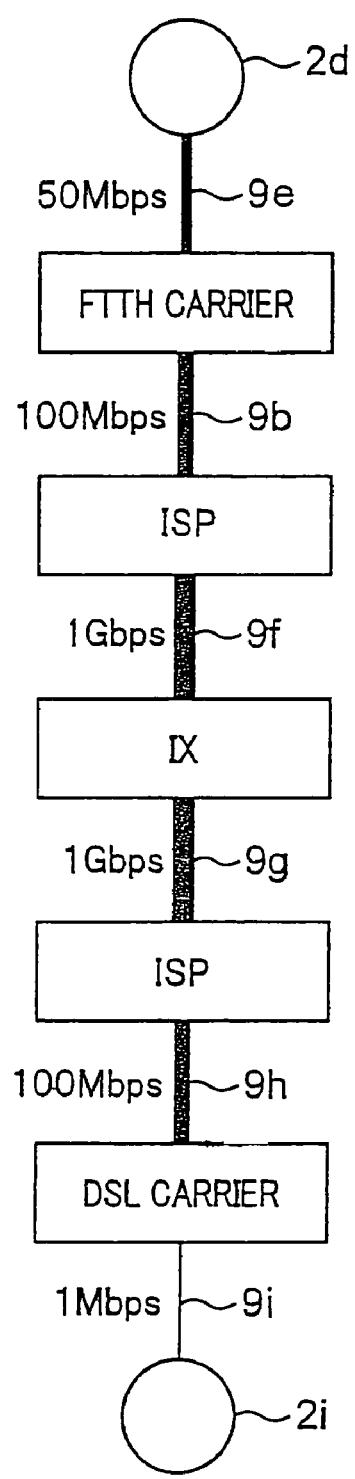
Figure 6B:
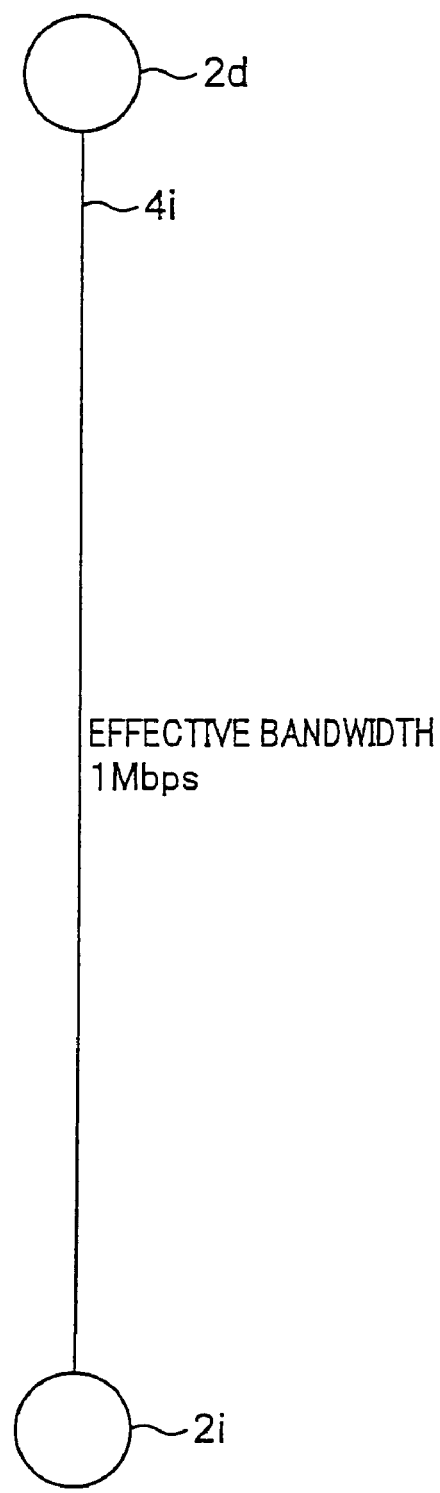

On the other hand, FIG. 6A is a diagram showing the bandwidths of the communication lines in the communication path 4i provided for the node 2i, and FIG. 6B is a diagram showing the effective bandwidth of the communication path 4i provided for the node 2i. As shown in FIG. 6A, the bandwidth of each of the communication lines 9f and 9g is 1 Gbps, the bandwidth of each of the communication lines 9b and 9h is 100 Mbps, and the bandwidth of the communication line 9e is 50 Mbps. However, since the bandwidth of the communication line 9i is only 1 Mbps, the communication line 9i is the bottleneck. As a result, the bandwidth of the communication path 4i is limited, and the effective bandwidth is 1 Mbps as shown in FIG. 5B.

The effective bandwidth of each communication path 4 may be obtained, for example, from each of the nodes 2 by the system management server 3 or may be set by an operator or the like. The effective bandwidth of each of the communication paths 4 may depend on the communication line 9 to a carrier to which the node 2 is connected, so that the information may be obtained as the effective bandwidth.

The effective bandwidth may be calculated on the basis of required time since transmission of packet data from a node 2 to the broadcasting station apparatus 1 connected to the node 2 or an upper node 2 to reception of the packet data by the broadcasting station apparatus 1 or the upper node 2. For example, each node 2 calculates data transfer speed from time since packet data is transmitted to another node 2 at a higher level connected to the node 2 until the packet data returned from the another node 2 at the higher level is received and distance between the node 2 and the another node 2 at the higher level connected to the node 2, and sets the calculated data transfer speed as an effective bandwidth.

The topology management policy is stored in, for example, the storage 32 updatably and includes not only the effective bandwidth information indicative of the effective bandwidth of each communication path provided for each of the nodes 2 but also, for example, maximum connection number information indicative of the maximum number of connections (the maximum number of branches) of nodes 2 connected at a lower level of (that is, immediately below) the broadcasting station apparatus 1, the maximum number of connections (the maximum number of branches) of the other nodes 2 connected at a lower level (that is, immediately below) the above-described nodes 2, and the maximum hierarchy level number information indicative of the maximum number of hierarchical levels formed by a plurality of nodes 2.

The maximum number of connections and the maximum number of hierarchical levels are determined in consideration of a load amount permitted on the whole tree type distribution system S, a load amount permitted to the broadcasting station apparatus 1 or the node 2, and the like. For example, in the case where the effective bandwidth of the communication path 4 provided for one node 2 is divided by the total number of all of the other nodes 2 connected as nodes at the lower level of the one node 2 and shared, the maximum number of connections is determined so that the effective bandwidth exceeds the pre-specified minimum effective bandwidth.

Since the contents data distributed from the broadcasting station apparatus 1 is sequentially transferred by the nodes 2, the lower the hierarchical level is, the longer contents data reception delay time becomes. The maximum number of levels is determined also in consideration of the reception delay time permitted in the tree type distribution system S.

The controller 31 as the effective bandwidth comparing means compares the effective bandwidths of the obtained communication paths 4, and as the connection mode setting means, sets a connection mode of the nodes on the basis of the comparison result so that the node 2 attached to the communication line 4 whose effective bandwidth is relatively wide is preferentially positioned at a higher hierarchical level.

For example, the nodes 2a and 2b attached to the communication line 4 whose effective bandwidth is the widest among the plurality of nodes 2 which can be connected to the broadcasting station apparatus 1 are set to be connected to the broadcasting station apparatus 1 so as to be positioned preferentially at the highest hierarchical level among all of the nodes 2. Subsequently, the nodes 2d and 2f attached to the communication path 4 whose effective bandwidth is the widest among all of the nodes 2 except for the nodes 2a and 2b are set to be connected so as to be preferentially positioned at the highest hierarchical level next to the level of the nodes 2a and 2b.

In such a manner, for example, the connection modes of the nodes 2 are set toward the lowest hierarchical levels. The controller 31 may properly determine as the connection determining means whether or not a node 2 can be connected at a lower hierarchical level to the broadcasting station apparatus 1 or one node 2 from the viewpoint of the maximum number of connections or the maximum number of hierarchical levels. For example, the controller 31 may set the connection modes of the nodes so that the number of connections of the other nodes 2 connected at the lower hierarchical level of the broadcasting station apparatus 1 or the one node 2 is smaller than or equal to the maximum number of connections of the broadcasting station apparatus 1 or the one node 2. The controller 31 may set the connection mode of nodes so that the number of hierarchical levels formed by the plurality of nodes 2 is finally smaller than or equal to the maximum number of hierarchical levels.

The controller 31 generates the connection mode table for each of the nodes 2 on the basis of the connection mode which is set as described above, and transmits as connection information transmitting means the connection mode table as connection information to each of the nodes 2 via the communication unit 33. Each of the nodes 2 transmits the connection request information to the broadcasting station apparatus 1 or the node 2 at the higher hierarchical level in accordance with the connection mode table, and is connected, thereby constructing the tree type distribution system S.

Figure 7:
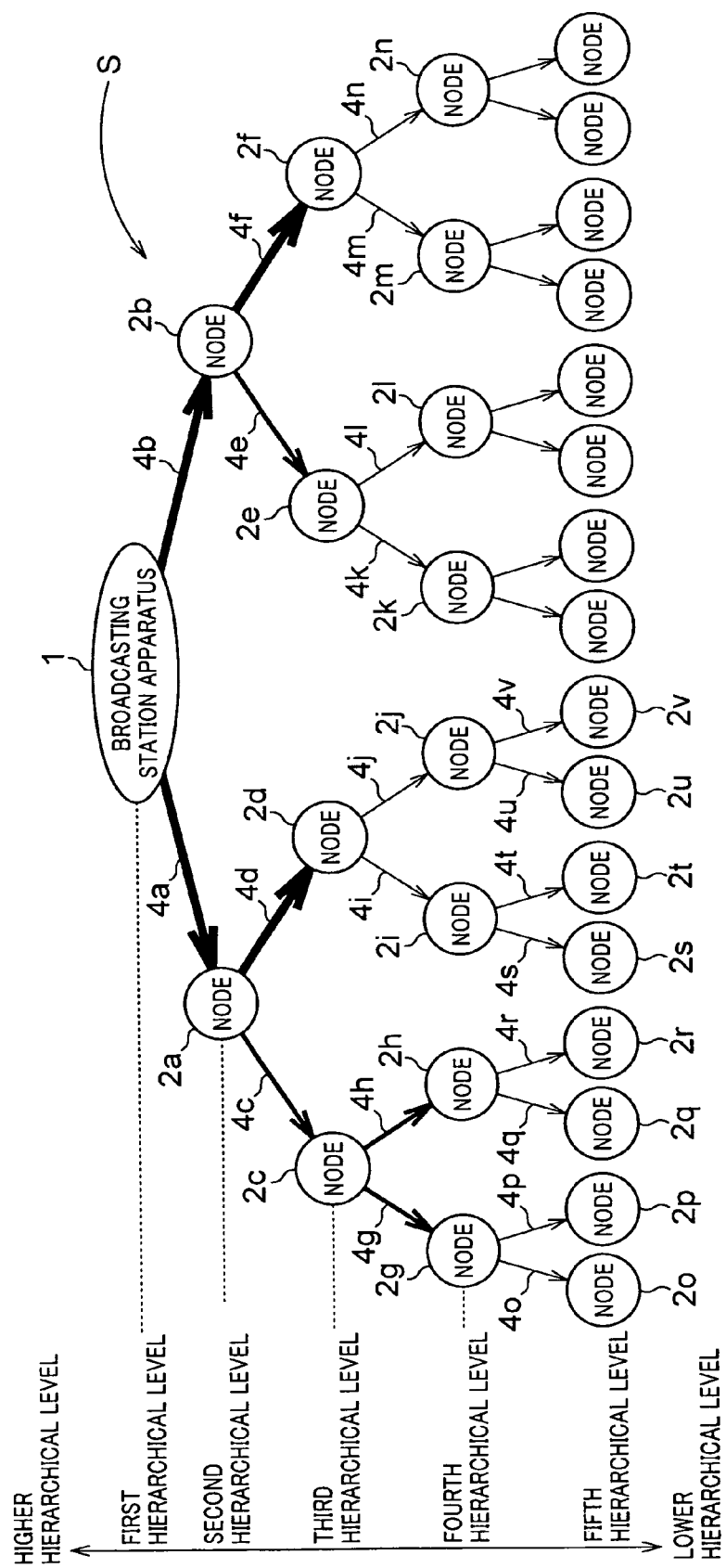
FIG. 7 is a conceptual diagram showing an example a connection mode of devices in a constructed tree distribution system S and the flow of contents data.

FIG. 7 is a conceptual diagram showing an example of a connection mode of nodes in the tree type distribution system S constructed as described above and the flow of contents data. It is understood from FIG. 7 that the effective bandwidths of the communication paths 4 are gradually narrowed from the node 2 at the highest hierarchical level toward the node 2 at the lowest hierarchical level.

After the tree type distribution system S is constructed, in the case where the unparticipating node 2 newly participates in the tree type distribution system S or in the case where a node 2 which becomes unable to receive the contents data due to withdrawal of the node 2 positioned at a high hierarchical level from the tree type distribution system S (the node 2 will be also called an unparticipating node 2X since it temporarily withdraws from the tree type distribution system S) newly participates in the tree type distribution system S, the unparticipating node 2X (a new node to participate in the tree type distribution system S) transmits participation request information indicative of a request for participating the tree type distribution system S to the system management server 3 via the network 10.

On the other hand, the controller 31 of the system management server 3, as participation request information receiving means, receives the participation request information transmitted from the unparticipating node 2X via the communication unit 33. For example, the participation request information includes the ID and the IP address of the unparticipating node 2X.

The controller 31 as the effective bandwidth information obtaining means obtains effective bandwidth information indicative of the effective bandwidth of the communication path 4 attached to the unparticipating node 2X so that the unparticipating node 2X which has transmitted the participation request information is connected to a node 2 at a higher hierarchical level or the broadcasting station apparatus 1. Further, the controller 31 obtains effective bandwidth information from the topology management policy. The effective bandwidth information indicates the effective bandwidth of the communication path 4 attached to at least one node 2 so that the one node 2 is connected to a node 2 at a higher hierarchical level or the broadcasting station apparatus 1.

The controller 31, as the effective bandwidth comparing means, compares the effective bandwidth of the communication path 4 attached to the node 2X and that of the communication path 4 attached to the at least one node 2. The controller 31 does not always have to compare the effective bandwidth of the communication path 4 attached to the unparticipating node 2X and that of the communication path 4 attached to all of the nodes 2. It is sufficient for the controller 31 to compare it with the effective bandwidth of the communication path 4 attached to a node 2 selected according to a predetermined reference.

The controller 31, as the connection mode setting means (connection destination setting means), sets the destination of the unparticipating node 2X so that the unparticipating node 2 is positioned at a level according to the effective bandwidth of the communication path 4 attached to the unparticipating node 2X.

For example, when the effective bandwidth of the communication path 4 attached to the unparticipating node 2X is wider than that of the communication path 4 attached to the node 2 compared, the controller 31 sets the connection destination so that the unparticipating node 2X is positioned at a hierarchical level higher than or the same hierarchical level as that of the node 2 compared. On the other hand, for example, in the case where the effective bandwidth of the communication path 4 attached to the unparticipating node 2X is narrower than that of the communication path 4 attached to the node 2 compared, the compared node 2 is set as the connection destination (the unparticipating node 2X is connected at a level lower than that of the compared node 2) or another node 2 connected at a hierarchical level lower than the compared node 2 is set as a connection destination.

In the case where there are a plurality of nodes 2 attached to the communication path 4 whose effective bandwidth is wider than that of the unparticipating node 2X, a node 2 connected to the communication path 4 whose effective bandwidth is the widest is set as a connection destination or another node 2 connected at a hierarchical level lower than the node 2 connected to the communication path 4 whose effective bandwidth is the widest may be set as a connection destination.

In this case as well, the controller 31 as the connection determining means may properly determine whether or not the unparticipating node 2X can be connected as a node at a lower hierarchical level to the broadcasting station apparatus 1 or one node 2 from the viewpoint of the maximum number of connections or the maximum number of hierarchical levels, and set the connection destination of each of the nodes so that, for example, the number of connections of the other nodes 2 connected at a level lower than that of the broadcasting station apparatus 1 or a node 2 is smaller than or equal to the maximum number of connections of the broadcasting station apparatus 1 or the one node 2. Alternatively, the controller 31 may set the connection destination of each of the nodes so that the number of hierarchical levels formed by a plurality of nodes 2 finally becomes equal to or smaller than the maximum number of hierarchical levels.

The controller 31 generates the connection mode table showing the IP address or the like of the connection destination of the unparticipating node 2X set as described above, and as the connection information transmitting means, transmits the connection mode table as connection information to the unparticipating node 2X via the communication unit 33. The unparticipating node 2X transmits connection request information to the broadcasting station apparatus 1 or a node 2 at a higher hierarchical level in accordance with the connection mode table and is connected to the connection destination, thereby reconstructing the tree type distribution system S.

[5. Operation of Tree Type Distribution System]

Next, the operation of the tree type distribution system S constructed and that of the tree type distribution system S reconstructed will be described with respect to the system management server 3 as a main body with reference to FIGS. 8 to 13 and the like.

Figure 8:
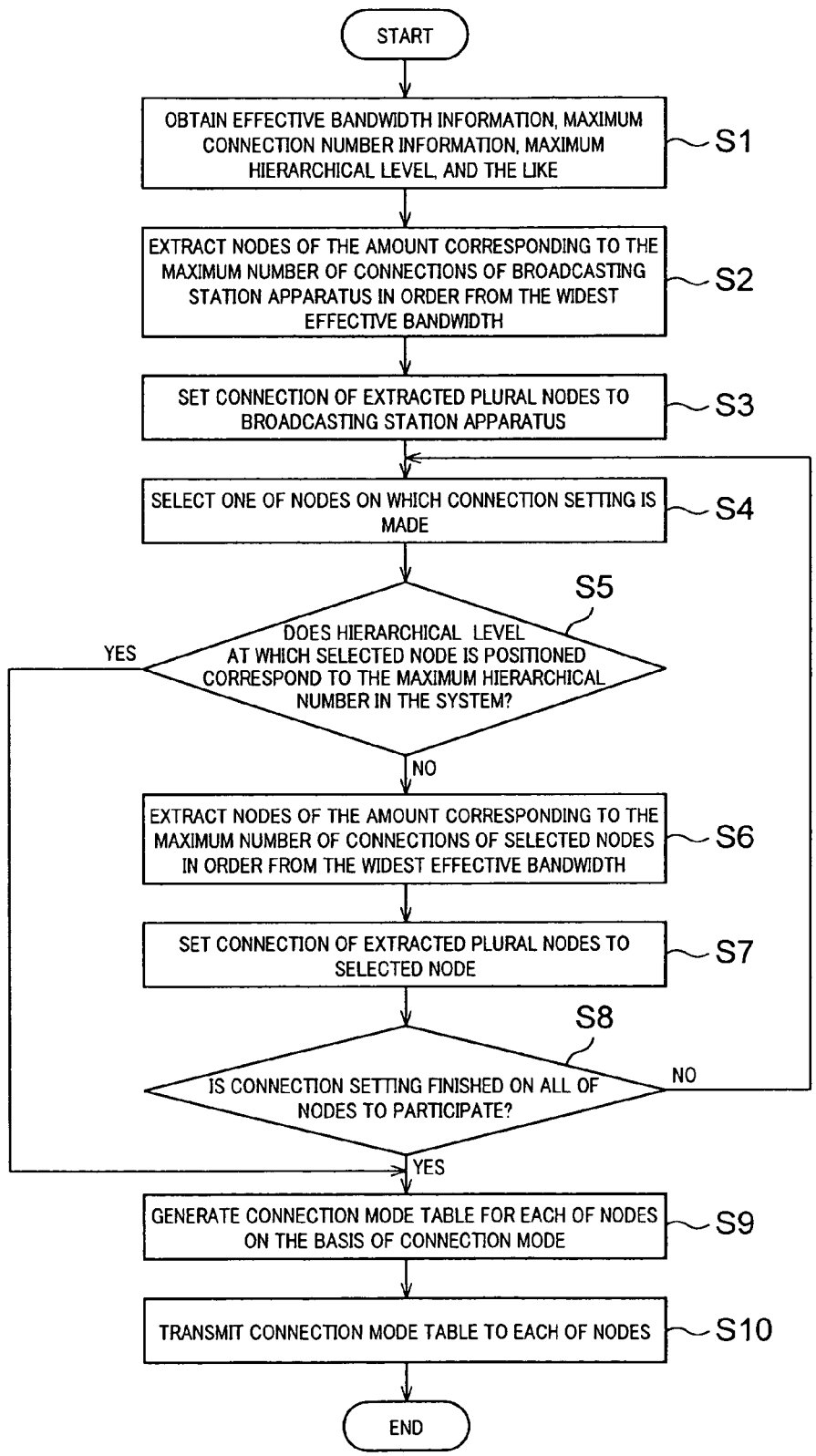
FIG. 8 is a flowchart showing an example of connection mode setting process in a controller 31 in the system management server 3 in the case where the tree distribution system S is constructed.
Figure 9:
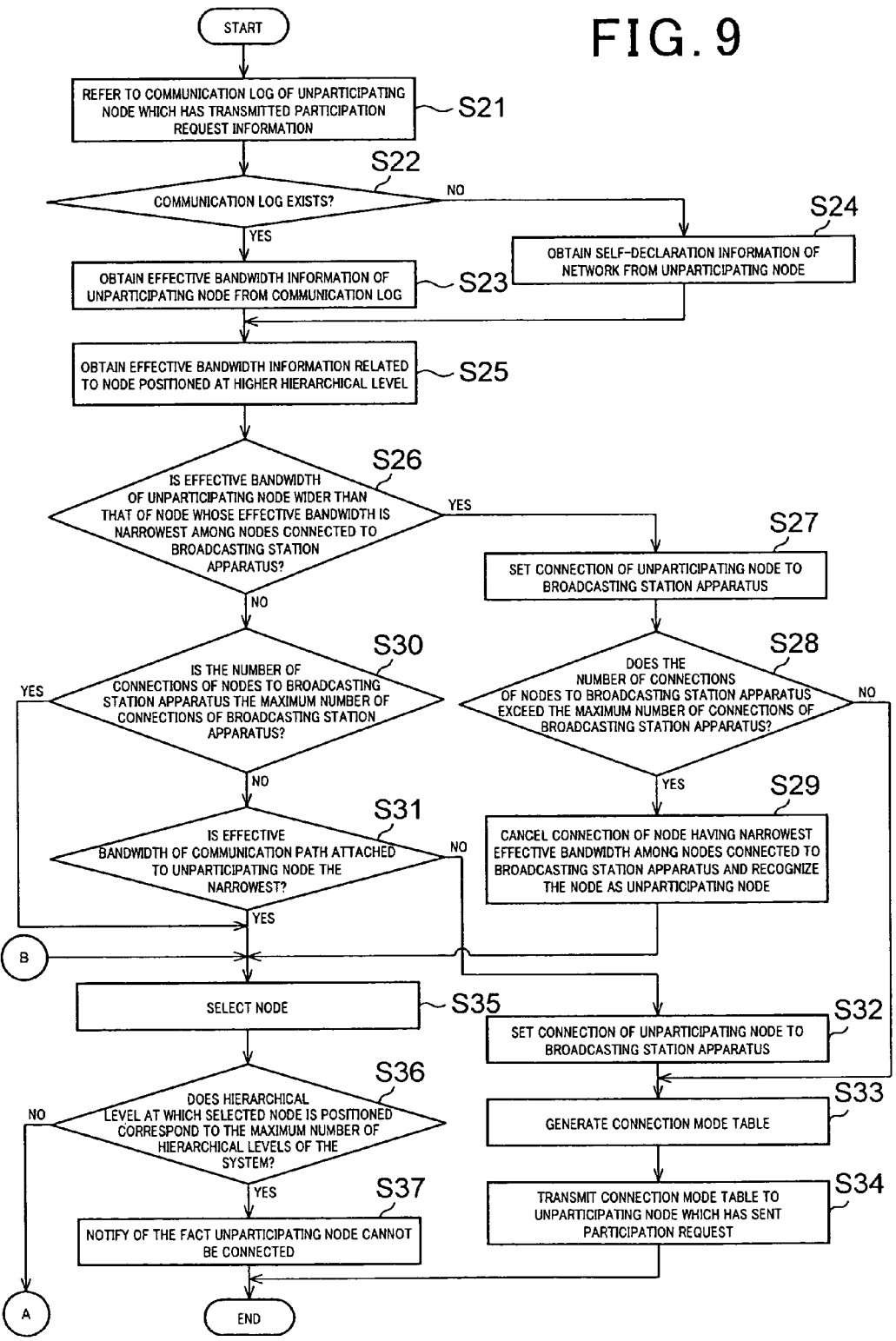
FIG. 9 is a flowchart showing an example of connection mode control process in the controller 31 in the system management server 3 in the case where the tree distribution system S is reconstructed.
Figure 10:
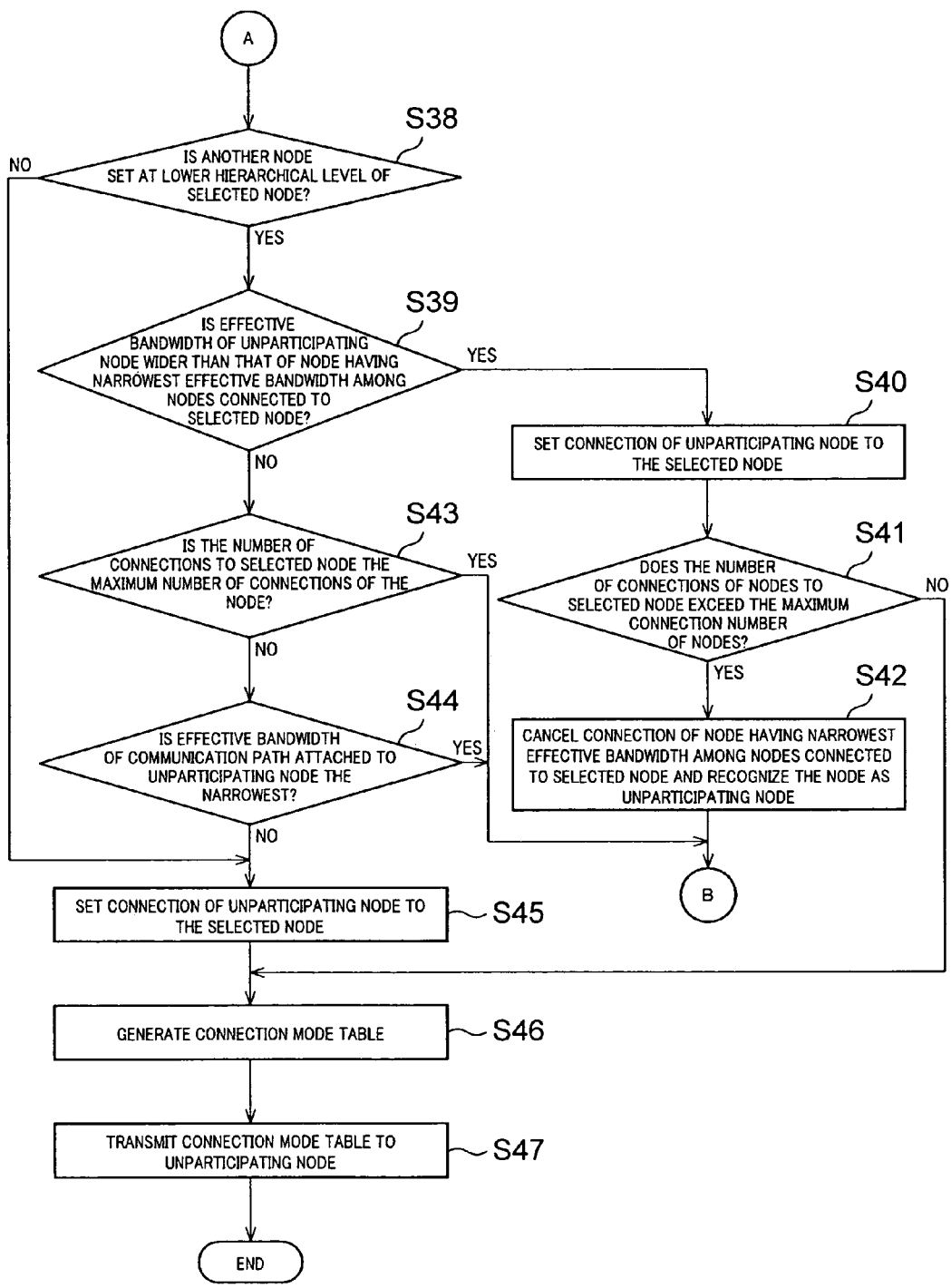
FIG. 10 is a flowchart showing an example of connection mode control process in the controller 31 in the system management server 3 in the case where the tree distribution system S is reconstructed.

FIG. 8 is a flowchart showing an example of the connection mode setting process in the controller 31 in the system management server 3 in the case where the tree type distribution system S is constructed. FIGS. 9 and 10 are flowcharts showing an example of the connection mode control process in the controller 31 in the system management server 3 in the case where the tree type distribution system S is reconstructed. FIGS. 11A to 11C are a diagram showing a state where a connection mode of a node 2 and the like is set. FIG. 12 is a diagram showing a state where a connection mode of a node 2 and the like is reset in the case where an unparticipating node 2 newly participates in the tree type distribution system S. FIG. 13 is a diagram showing a state where the connection mode of the node 2 and the like is reset in the case where the node 2 positioned at a higher hierarchical level withdraws from the tree type distribution system S.

FIGS. 8 to 10 show an example of processes executed by the respective means in the controller 31 in the system management server 3, to which the invention is not limited.

First, the operation in the case where the tree type distribution system S is constructed will be described with reference to FIGS. 8 to 11 and the like.

For example, when a plurality of nodes 2 to participate the tree type distribution system S are set, the processes shown in FIG. 8 start. First, for all of the nodes 2, the effective bandwidth information indicative of the effective bandwidth of the communication path 4 attached, the maximum connection number information indicative of the maximum number of connections, the maximum connection number information indicative of the maximum number of connections of the broadcasting station apparatus 1, and the maximum hierarchical level number information indicative of the maximum number of hierarchical levels in the tree type distribution system S is obtained from the topology management policy stored in the storage 32 (obtained by the effective bandwidth information obtaining means) (step S1).

Next, the effective bandwidths of the communication paths 4 of the nodes 2 are compared with each other (by the effective bandwidth comparing means). The nodes 2 corresponding to the maximum number of connections (for example, 2) of the broadcasting station apparatus 1 are extracted in order from the widest effective bandwidth (step S2), and connection of the extracted plurality of nodes 2 to the broadcasting station apparatus 1 is set (by the connection mode setting means) (step S3). As shown in FIG. 11A, connection of the nodes 2a and 2b to the broadcasting station apparatus 1 is set.

Thereafter, one of the nodes 2 set to be connected to the broadcasting station apparatus 1 is selected (step S4). For example, the node 2 attached to the communication path 4 having the widest effective bandwidth is selected (in the case where nodes 2 having the same effective bandwidth exists, for example, the node 2 having the smaller ID number is selected).

Subsequently, it is determined whether or not the hierarchical level at which the selected node 2 is positioned corresponds to the maximum hierarchical level in the tree type distribution system S (step S5). In the case where it corresponds to the maximum hierarchical level (step S5:YES), connection cannot be set to the lower hierarchical levels, so that the controller 31 advances to step S9. For example, when the maximum hierarchical level is 2, the node 2a shown in FIG. 11A is positioned at the second hierarchical level which corresponds to the maximum hierarchical level. In the case where it corresponds to the maximum hierarchical level, the maximum number of hierarchical levels in the tree type distribution system S may be increased by predetermined number of levels, and the controller 31 may advance to step S6.

On the other hand, when the hierarchical level at which the selected node 2 is positioned does not correspond to the maximum hierarchical level (step S5:NO), the widths of the effective bandwidths of the communication paths 4 of all of nodes 2 except for the node 2 on which the connection setting has been made are compared with each other. Nodes 2 (except for the node 2 on which the connection setting has been made) of the amount corresponding to the maximum number of connections (for example, the maximum number of connections is 2) of the selected node 2 are extracted, for example, in order from the widest effective bandwidth (step S6). Connection of the extracted plural nodes 2 to the selected node 2 is set (by the connection mode setting means) (step S7). For example, as shown in FIG. 11B, the extracted nodes 2c and 2d are connected at the level lower than the selected node 2a.

Subsequently, it is determined whether or not the connection setting of all of the nodes 2 to participate has been finished (step S8). In the case where the connection setting of all of the nodes 2 has not been finished (step S8:NO), the controller 31 returns to step S4. In the case where the connection setting of all of the nodes 2 is finished (step S8:YES), the controller 31 advances to step S9.

In step S4 to which the controller 31 returns from step S8, a node 2 (in the example of FIG. 11B, the node 2b) is selected which is positioned at the highest hierarchical level among the other nodes 2 set to be connected to the broadcasting station apparatus 1 or the node 2 positioned at the highest level and to which the other nodes 2 at the lower hierarchical levels are not connected yet, and attached to the communication path 2 having the widest effective bandwidth. In a manner similar to the above, the processes in step S5 and subsequent steps are performed, thereby setting the connection of the node 2 as shown in FIG. 11C.

In such a manner, until it is determined that the hierarchical level at which the selected node 2 is positioned corresponds to the maximum hierarchical level in step S5 or it is determined that the connection setting has been finished on all of the nodes 2 in step S8, the processes in steps S4 to S7 are repeatedly performed. The connection modes of the nodes are set so that the node 2 attached to the communication path 4 whose effective bandwidth is relatively wide is preferentially positioned at a higher hierarchical level. The number of hierarchical levels formed by the nodes 2 gradually increases.

In step S9, on the basis of the connection mode which is set as described above, the connection mode table is generated for each of the nodes 2. The information written in the connection mode tables vary, for example, among the nodes 2. For example, the connection mode table for a node 2 includes: the IP address of the broadcasting station apparatus 1 or a node 2 at the higher hierarchical level to which the node 2 itself is connected (or the apparatus ID necessary for obtaining the IP address); the IP address of a node 2 at a lower hierarchical level to which the node 2 itself is connected (or the apparatus ID necessary for obtaining the IP address); and in the case where the higher hierarchical level to which the node 2 itself is connected is a node 2, the IP address of the broadcasting station apparatus 1 or a node 2 at a higher hierarchical level to which the node 2 at the higher hierarchical level is connected (or the apparatus ID for obtaining the IP address).

Subsequently, the generated connection mode table is transmitted (by the connection information transmitting means) to each node 2 via the network 10 (step S10), and the process is finished. The connection mode table may be transmitted in response to a request from a node 2.

After the connection mode table is transmitted to each of the nodes 2, the node 2 transmits the connection request information to the broadcasting station apparatus 1 or a node 2 at a higher hierarchical level and is electrically connected in accordance with the connection mode table (for example, the IP address included therein). As a result, for example, as shown in FIG. 7, the tree type distribution system S in which the effective bandwidths of the communication paths 4 gradually narrow from the node 2 at the highest hierarchical level to the node 2 at the lowest hierarchical level is configured.

Referring now to FIGS. 9 and 10 as well as FIGS. 12 and 13, and the like, operations in the case where the tree type distribution system S is reconstructed will be described.

For example, in the case where the unparticipating node 2X shown in FIG. 12 newly participates in the tree type distribution system S, the unparticipating node 2X transmits participation request information indicative of a request of participation in the tree type distribution system S to the system management server 3 via the network 10. Alternatively, for example, the nodes 2g and 2h, which become the unparticipating nodes 2X and cannot receive contents data due to withdrawal of the node 2c positioned at a higher hierarchical level shown in FIG. 13 from the tree type distribution system S for some reason such as power disconnection or failure, transmit participation request information indicative of a request for participation in the tree type distribution system S to the system management server 3. The participation request information includes the IP addresses or the IDs of the unparticipating nodes 2.

The participation request information transmitted as described above is received by the system management server 3 (participation request information receiving means) and the processes shown in FIG. 9 start.

First, a communication log (log of past communications) of the unparticipating node 2X which has transmitted the participation request information is referred to (step S21), and whether a communication log exists or not is determined (step S22). A communication log includes, for example, information such as communication date and time, the IP address and the port used for communication, the type of a communication protocol, various messages generated by the communication protocol, and further, the effective bandwidth information. In place of the effective bandwidth information, packet transmission/reception time required for transmission/reception of a predetermined amount of packet data may be included.

When there is a communication log (step S22:YES), the effective bandwidth information of the unparticipating node 2X is obtained from the communication log (step S23). For example, in the case of FIG. 13, there is a log of communication with the node 2g which has become the unparticipating node 2X.

On the other hand, when there is no communication log (step S22:NO), for example, self-declaration information (including information such as the line type and the effective bandwidth information) of a network which is set at the time of participation for the first time is obtained from the unparticipating node 2X (step S24).

Subsequently, the effective bandwidth information indicative of the effective bandwidth of the communication path 4 attached to a node 2 positioned at a higher hierarchical level, the maximum connection number information indicative of the maximum number of connections, the maximum connection number information indicative of the maximum number of connections of the broadcasting station apparatus 1, and the maximum hierarchical level number information indicative of the maximum number of hierarchical levels in the tree type distribution system S is obtained from the topology management policy stored in the storage 32 (step S25).

Next, the effective bandwidths of the communication paths 4a and 4b attached to the nodes 2a and 2b connected to the broadcasting station apparatus 1 (that is, just below the broadcasting station apparatus 1) are compared with each other (by the effective bandwidth comparing means). It is determined whether or not the effective bandwidth of the communication path 4 attached to the unparticipating node 2X is wider than the narrowest bandwidth of the communication path 4 attached to a node 2 among the effective bandwidths of the communication paths 4 attached to the node 2 currently connected to the broadcasting station apparatus 1 (step S26). If it is not the narrowest (step S26:YES), connection of the unparticipating node 2X to the broadcasting station apparatus is set (step S27), and the system management server 3 moves to step S28. That is, since the effective bandwidth of the communication path 4 attached to the unparticipating node 2X is the widest, the unparticipating node 2X is forcedly connected as a node just below the broadcasting station apparatus 1.

In step S28, it is determined whether or not the number of connections of the nodes 2 to the broadcasting station apparatus 1 exceeds the maximum number of connections of the broadcasting station apparatus 1 due to the forced connection of the unparticipating node 2X. In the case where it exceeds the maximum number of connections (step S28:YES), the connection setting of the node 2 attached to the communication path whose effective bandwidth is the narrowest among the nodes 2 connected to the broadcasting station apparatus 1 is cancelled, the node 2 is recognized as the unparticipating node 2X (step S29), and the system management server 3 advances to step S35. Specifically, since the number of connections exceeds the maximum number of connections of the broadcasting station apparatus 1, a node 2 attached to the communication path whose effective bandwidth is the narrowest is moved to the immediately lower hierarchical level among the nodes 2 connected to the broadcasting station apparatus 1. Consequently, in the following step S35, a node 2 to which the unparticipating node 2X recognized in the step S29 is connected is selected.

On the other hand, in the case where the number of connections does not exceed the maximum number of connections in the step S28 (step S28:NO), the system management server 3 advances to step S33.

In the case where the effective bandwidth of the communication path 4 attached to the unparticipating node 2X is not the widest in step S26 (step S26:NO), it is determined whether or not the number of connections of the nodes 2 to the broadcasting station apparatus 1 is the maximum connection number of the broadcasting station apparatus 1 (step S30). If it is the maximum number of connections (step S30:YES), the system management server 3 advances to step S35. That is, since the number of connections reaches the maximum number of connections of the broadcasting station apparatus 1, the unparticipating node 2 is moved to the immediately lower hierarchical level. On the other hand, if it is not the maximum number of connections (that is, it is less than the maximum number of corrections) (step S30:NO), the effective bandwidth of the communication path 4a or 4b attached to the node 2a or 2b connected to the broadcasting station apparatus 1 is compared with that of the communication path 4 attached to the unparticipating node 2X (by the effective bandwidth comparing means). For example, it is determined whether or not the effective bandwidth of the communication path 4 attached to the unparticipating node 2X is the narrowest (step S31). If it is the narrowest (step S31:YES), the system management server 3 moves to the step S35. That is, the effective bandwidth of the communication path 4 attached to the unparticipating node 2X is narrower than, for example, those of the communication paths 4a and 4b. Consequently, the unparticipating node 2X is not positioned at the same hierarchical level as that of the nodes 2a and 2b but is positioned at a hierarchical level lower than the nodes 2a and 2b.

Even in the case where the effective bandwidth of the communication path 4 attached to the unparticipating node 2X is the narrowest, the system management server 3 may advance to step S32 to position the unparticipating node 2X at the same hierarchical level as that of the nodes 2a and 2b if the difference of the effective bandwidths (for example, the difference from narrower one of the effective bandwidths of the nodes 2a and 2b) lies in a predetermined range.

On the other hand, in the case where the effective bandwidth of the communication path 4 attached to the unparticipating node 2X is not the narrowest (step S31:NO), connection of the unparticipating node 2X to the broadcasting station apparatus 1 is set (step S32), and the system management server 3 shifts to step S33.

In step S33, a connection mode table is generated as connection information necessary for connection to the broadcasting station apparatus 1 as a connection destination of the unparticipating node 2X set in the step S27 or S32. The connection mode table includes, for example, the IP address (or the apparatus ID necessary for obtaining the IP address) of the broadcasting station apparatus 1 as a connection destination.

Subsequently, the generated connection mode table is transmitted to the unparticipating node 2X which has sent a participation request via the network (by the connection information transmitting means) (step S34), and the process is finished. The connection mode table may be transmitted in response to a request from the unparticipating node 2X.

When the connection mode table is transmitted to the unparticipating node 2X, the unparticipating node 2X transmits the connection request information to the broadcasting station apparatus 1 in accordance with the connection mode table (for example, the IP address included in the table), and is electrically connected. In such a manner, for example, the tree type distribution system S is reconstructed.

In step S35, for example, the node 2 (the node 2a in the example of FIGS. 12 and 13) to which the communication path 4 having the widest effective bandwidth is selected among the nodes 2 set to be connected to the broadcasting station apparatus 1.

It is determined whether or not the hierarchical level at which the selected node 2 is positioned corresponds to the maximum hierarchical level in the tree type distribution system S (step S36). In the case where it corresponds to the maximum hierarchical level (in the example of FIGS. 12 and 13, for example, a hierarchical level at which the node 2i or the like is positioned corresponds to the maximum hierarchical level) (step S36:YES), for example, a message indicative of a disconnectable state is notified to the unparticipating node 2X (step S37), and the process is finished. In the case where the hierarchical level at which the selected node 2 is positioned corresponds to the maximum hierarchical level, the maximum number of hierarchical levels in the tree type distribution system S may be increased by a predetermined number of levels in the tree type distribution system S, and the system management server 3 advances to step S39 shown in FIG. 10.

On the other hand, in the case where the hierarchical level does not correspond to the maximum hierarchical level (step S36:NO), the system management server 3 advances to step S38 shown in FIG. 10.

In step S38 shown in FIG. 10, it is determined whether or not the other nodes 2 are set to be connected at a lower hierarchical level to the selected node 2. If not (step S38:NO), connection to the selected node 2, of the unparticipating node 2X (the unparticipating node 2X requesting for participation, the unparticipating node 2X recognized in the step S29, or the unparticipating node 2X recognized in step S42 which will be described later) is set (step S45).

On the other hand, in the case where the connection setting is made (step S38:YES), the effective bandwidth of the communication path 4 attached to the node 2 connected to the selected node 2 (that is, just below the selected node 2) is compared with the effective bandwidth of the communication path 4 attached to the unparticipating node 2X (by the effective bandwidth comparing means). It is determined whether or not the effective bandwidth of the communication path 4 attached to the unparticipating node 2X is wider than the narrowest bandwidth of the communication path 4 attached to a node 2 among the effective bandwidths of the communication paths 4 attached to the node 2 currently connected to the selected node 2 (step S39). If it is not the narrowest (step S39:YES), connection of the unparticipating node 2X to the selected node 2 is set (step S40), and the system management server 3 moves to step S41. That is, the effective bandwidth of the communication path 4 attached to the unparticipating node 2X is the widest, so that the unparticipating node 2X is forcedly connected as a node just below the selected node 2.

In step S41, it is determined whether or not the number of connections of the nodes 2 to the selected node 2 exceeds the maximum number of connections of the selected node 2 due to the forced connection of the unparticipating node 2X. In the case where it exceeds the maximum number of connections (step S41:YES), the connection setting of the node 2 attached to the communication path whose effective bandwidth is the narrowest among the nodes 2 connected to the selected node 2 is cancelled, the node 2 is recognized as the unparticipating node 2X (step S42), and the system management server 3 advances to step S35 shown in FIG. 9. Specifically, since the number of connections exceeds the maximum number of connections of the selected node 2, a node 2 attached to the communication path whose effective bandwidth is the narrowest is moved to the immediately lower hierarchical level among the nodes 2 connected to the selected node 2. Consequently, in the following step S35, a node 2 to which the unparticipating node 2X recognized in the step S42 is connected is selected.

On the other hand, in the case where the number of connections does not exceed the maximum number of connections in the step S41 (step S41:NO), the system management server 3 advances to step S46.

In the case where the effective bandwidth of the communication path 4 attached to the unparticipating node 2X is not the widest in step S39 (step S39:NO), it is determined whether or not the number of connections to the selected node 2 is the maximum number of connections of the node 2 (step S43). If it is the maximum number of connections (step S43: YES), the system management server 3 advances to step S35 shown in FIG. 9. That is, since the number of connections reaches the maximum number of connections of the selected node 2, the unparticipating node 2X is moved to the immediately lower hierarchical level.

On the other hand, in the case where the number of connections is not the maximum number of connections (that is, it is less than the maximum number of corrections) (step S43:NO), the effective bandwidth of the communication path 4 attached to the node 2 connected at the lower hierarchical level to the selected node 2 is compared with that of the communication path 4 attached to the unparticipating node 2X. For example, it is determined whether or not the effective bandwidth of the communication path 4 attached to the unparticipating node 2X is the narrowest (step S44). If it is the narrowest (step S44:YES), the system management server 3 returns to the step S35. That is, the effective bandwidth of the communication path 4 attached to the unparticipating node 2X is narrower than, for example, those of the communication paths 4c and 4d attached to the nodes 2c and 2d connected at the lower hierarchical level to the node 2a shown in FIG. 12. Consequently, the unparticipating node 2X is not positioned at the same hierarchical level as that of the nodes 2c and 2d but is positioned at a hierarchical level lower than the nodes 2c and 2d.

Even in the case where the effective bandwidth of the communication path 4 attached to the unparticipating node 2X is the narrowest, the system management server 3 may advance to step S45 to position the unparticipating node 2X at the same hierarchy level as that of the nodes 2c and 2d if the difference of the effective bandwidths lies in a predetermined range.

On the other hand, in the case where the effective bandwidth of the communication path 4 attached to the unparticipating node 2X is not the narrowest (step S44:NO), connection of the unparticipating node 2X (the unparticipating node 2X requesting for participation, the unparticipating node 2X recognized in the step S29, or the unparticipating node 2X recognized in the step S42) to the selected node 2 is set (step S45).

In step S35 shown in FIG. 9 to which the system management server 3 returns from the steps S42 to S44 shown in FIG. 10, among the nodes 2 which are not selected yet, for example, the node 2 to which the communication path 2 positioned at the highest hierarchical level and whose effective bandwidth is the widest is selected (for example, in the example of FIGS. 12 and 13, the node 2b is selected next to the node 2a). In a manner similar to the above, the processes in step S36 and subsequent steps, and the connection destination of the unparticipating node 2X is set. That is, the connection destination of the unparticipating node 2X is set (by the connection destination setting means) so that the unparticipating node 2X is positioned at a hierarchical level according to the effective bandwidth of the communication path 4 attached (in the example shown in FIGS. 12 and 13, the unparticipating node 2X is connected at a hierarchical level lower than the node 2d or the like).

In step S46, a connection mode table is generated as connection information necessary for connection to the node 2 as a connection destination of the unparticipating node 2X set as described above. The connection mode table includes, for example, the IP address (or the apparatus ID necessary for obtaining the IP address) of the node 2 as a connection destination.

Subsequently, the generated connection mode table is transmitted to the unparticipating node 2X (the unparticipating node 2X which has sent a participation request, the unparticipating node 2X recognized in the step S29, and the unparticipating node 2X recognized in the step S42) via the network 10 (by the connection information transmitting means) (step S47), and the process is finished. The connection mode table may be transmitted in response to a request from the unparticipating node 2X.

When the connection mode table is transmitted to the unparticipating node 2X, the unparticipating node 2X transmits the connection request information to the node 2 at the higher hierarchical level in accordance with the connection mode table (for example, the IP address included in the table), and is electrically connected. In such a manner, for example, the tree type distribution system S is reconstructed.

As described above, in the case where the tree type distribution system S is constructed in the foregoing embodiment, the connection mode of the nodes is set so that a node 2 attached to the communication path 4 whose effective bandwidth is relatively wide is preferentially positioned at a higher hierarchical level by the system management server 3. Consequently, a node 2 having relatively high supply capability is positioned at a higher hierarchical level, a node 2 having relatively low supply capability is positioned at a lower hierarchical level, and the effective bandwidth of the communication path among the nodes in the systems can be optimized. Therefore, even if a resume operation or the like accompanying participation, withdrawal, or the like to/from the system S is performed, the communication performance can be improved over the wide range of the system S without exerting an adverse influence on the whole system S.

Moreover, the number of connections of the other nodes connected at a lower hierarchical level of the broadcasting station apparatus 1 or the node 2 is regulated to the maximum number of connections. For this reason, a load is concentrated in one node but can be dispersed. Further, the number of hierarchical levels formed by the plurality of nodes 2 in the system S is regulated to the maximum number of levels, so that the load on the whole system can be suppressed. Even if a resume operation or the like accompanying participation, withdrawal, or the like to/from the system S is performed, the communication performance can be further improved over the wide range of the system S without exerting an adverse influence on the whole system S.

In the case where the tree type distribution system S is reconstructed in the foregoing embodiment, the connection destination of the unparticipating node 2X to participate in the system S is set so that the unparticipating node 2X is positioned at a level according to the effective bandwidth of the communication path attached. Consequently, even if participation/withdrawal to/from the system S is repeated and the reconstruction of the system S is repeated, a node 2 whose supply capability is relatively high is maintained at a higher hierarchical level and a node 2 whose supply capability is relatively low is maintained at a lower hierarchical level. Thus, optimization of the effective bandwidths of the communication paths among the nodes in the system S can be maintained. Therefore, even if the system S is repeatedly reconstructed, the communication performance can be improved over the wide range of the system without exerting an adverse influence on the whole system.

In this case as well, the number of connections of other nodes 2 connected at a lower hierarchical level than the broadcasting station apparatus 1 or the node 2 is regulated to the maximum number of connections. For this reason, a load is not concentrated in one node but can be dispersed. Further, the number of hierarchical levels formed by the plurality of nodes 2 in the system S is regulated to the maximum number of hierarchical levels, so that the load on the whole system can be suppressed. Even if the reconstruction of the system is repeatedly performed, the communication performance can be further improved over the wide range of the system without exerting an adverse influence on the whole system.

The example in which the system management server 3 functions as the connection mode setting apparatus and a connection mode control apparatus has been described in the foregoing embodiment. However, in place of the system management server 3, the broadcasting station apparatus 1 may function as the connection mode setting apparatus and the connection mode control apparatus. In this case, when the CPU in the controller 11 in the broadcasting station apparatus 1 executes the connection mode setting program and the connection mode control program stored in the storage 12 or the like, the controller 11 functions as the effective bandwidth information obtaining means, effective bandwidth comparing means, connection mode setting means (connection destination setting means), participation request information receiving means, and connection information transmitting means of the present invention, and executes the connection mode setting process shown in FIG. 8 and the connection mode control process shown in FIGS. 9 and 10.

[6. Embodiment in the Case where no System Management Server 3 Exists]

In the foregoing embodiment, the case where the system management server 3 or the broadcasting station apparatus 1 manages the connection mode of the whole tree type distribution system S has been described. Description will be given to the case where the system management server 3 or the like for managing the connection mode of the whole tree type distribution system S does not exist and the tree type distribution system S is reconstructed by autonomously by nodes 2.

In this case, it is a precondition that the tree type distribution system S is already constructed by some method (for example, the system management server 3, the broadcasting station apparatus 1, or the like).

The configuration of the tree type distribution system S in this case is as shown in FIG. 1 in a manner similar to the foregoing embodiment except that the system management server 3 does not exist. The broadcasting station apparatus 1 and the node 2 in this case have configurations and functions similar to those of the broadcasting station apparatus 1 and the node 2 in the foregoing embodiment. Further, the node 2 functions also as the connection mode control apparatus (in other words, the connection mode control apparatus is included in a part of the node 2).

Specifically, when the CPU in the controller 21 in the node 2 executes the connection mode control program stored in the storage 22 or the like, the controller 21 functions as the effective bandwidth information obtaining means, effective bandwidth comparing means, connection destination setting means, participation request information receiving means, connection-information transmitting means, connection determining means, and receiving apparatus selecting means of the present invention. The details of the respective means will be described in the following operation.

Each of the nodes 2 updatably stores the topology management policy in, for example, the storage 22. The topology management policy includes the IP address (or the apparatus ID for obtaining the IP address), the maximum connection number information, and the effective bandwidth information of the broadcasting station apparatus 1 or the node 2 connected at a higher hierarchical level, the maximum connection number information and effective bandwidth information of the self node 2, and the IP address (or the apparatus ID for obtaining the IP address) of the node 2 connected at a lower hierarchical level, the maximum connection number information, and the effective bandwidth information of the node 2 connected at a lower hierarchical level (except for the case where the node 2 is not connected at a lower hierarchical level). Further, in the case where the broadcasting station apparatus 1 or the node 2 positioned at a level higher by two levels, the IP address (or the apparatus ID necessary for obtaining the IP address) of the broadcasting station apparatus 1 or the node 2 is included.

Next, with reference to FIGS. 14 to 17, the operation of the tree type distribution system S reconstructed autonomously will be described with respect to mainly the node 2.

Figure 14:
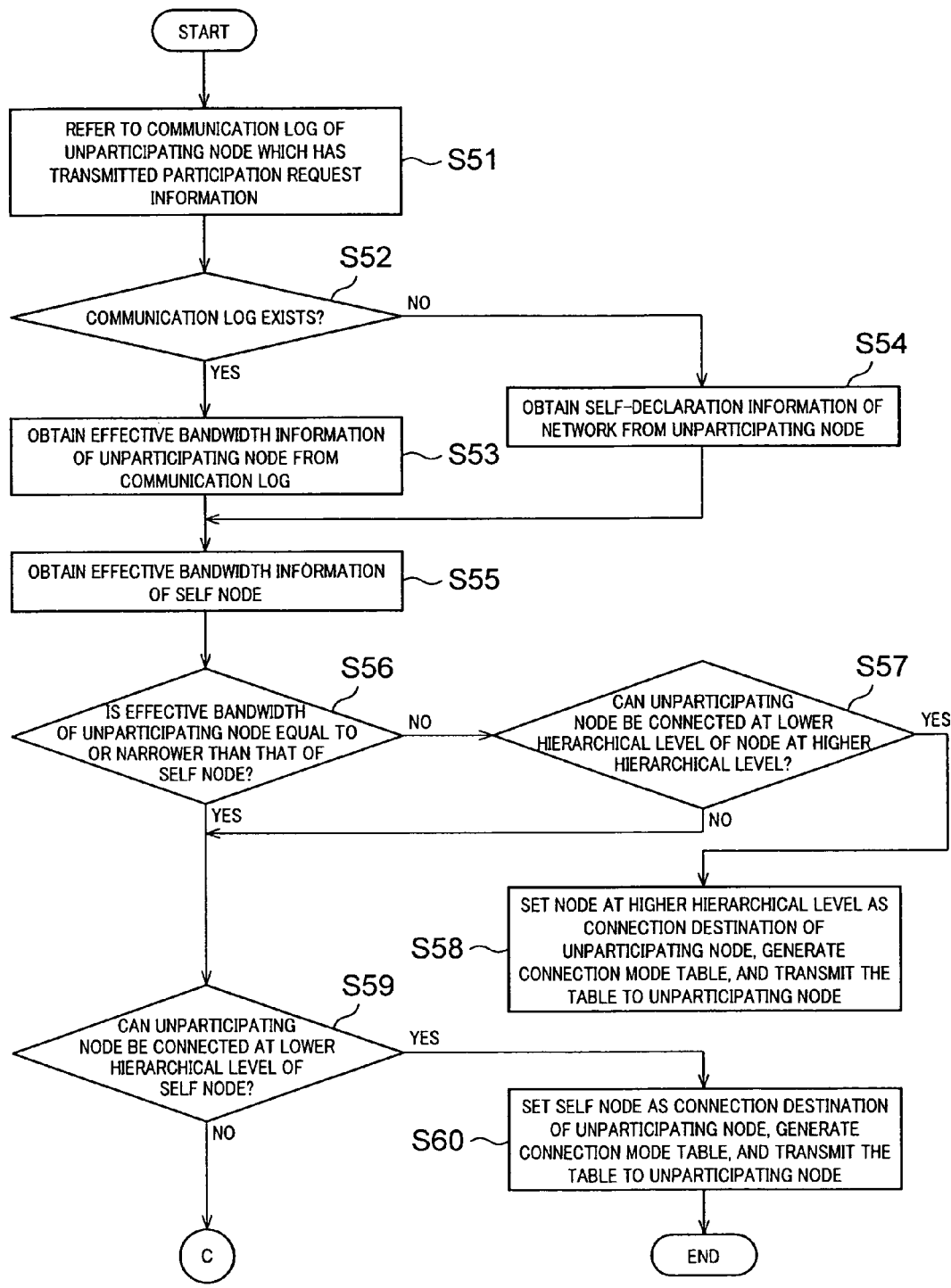
FIG. 14 is a flowchart showing an example of connection mode control process in a controller 21 in a node 2 in the case where the tree distribution system S is autonomously reconstructed.
Figure 15:
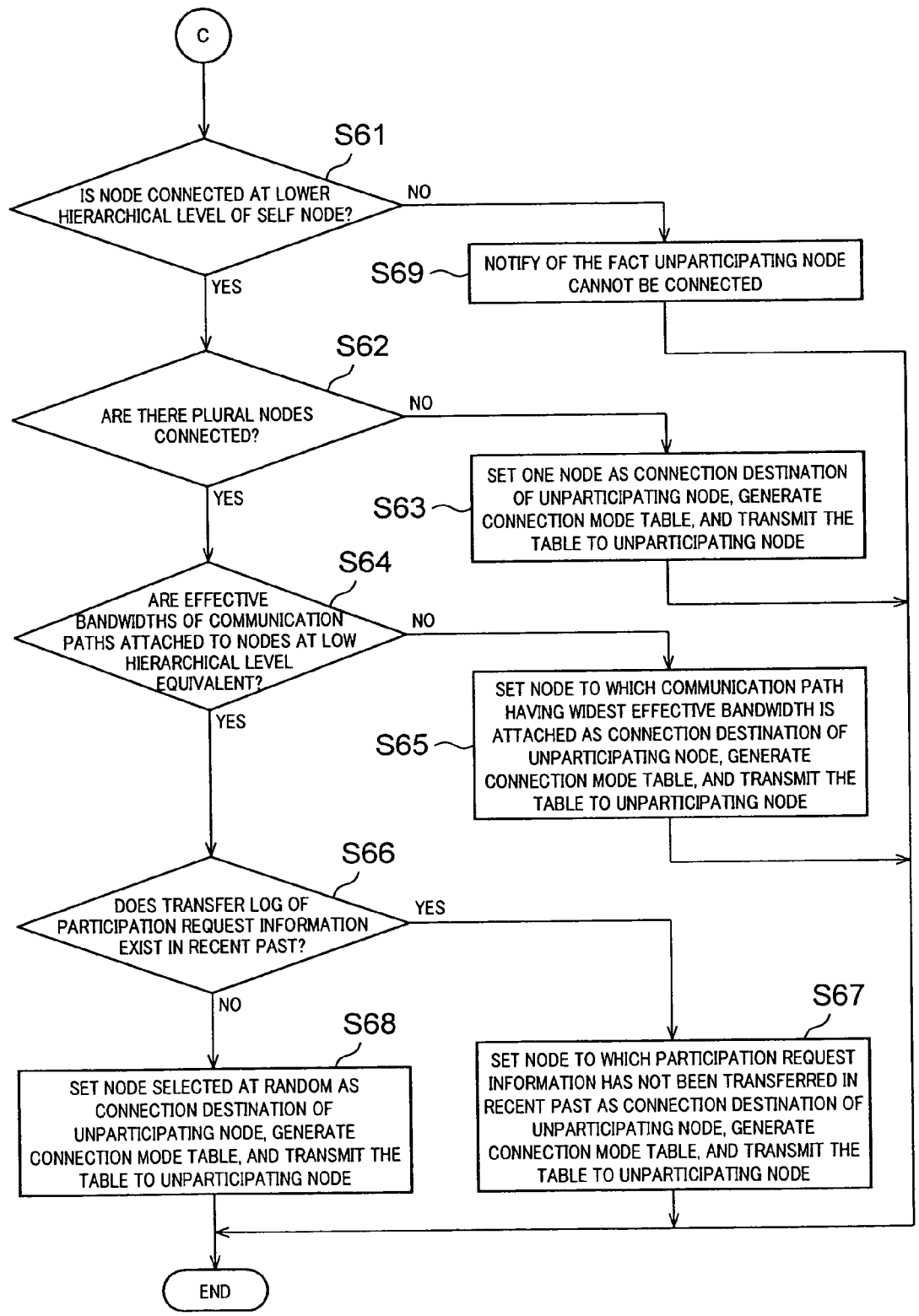
FIG. 15 is a flowchart showing an example of the connection mode control process in the controller 21 in the node 2 in the case where the tree distribution system S is autonomously reconstructed.
Figure 16:
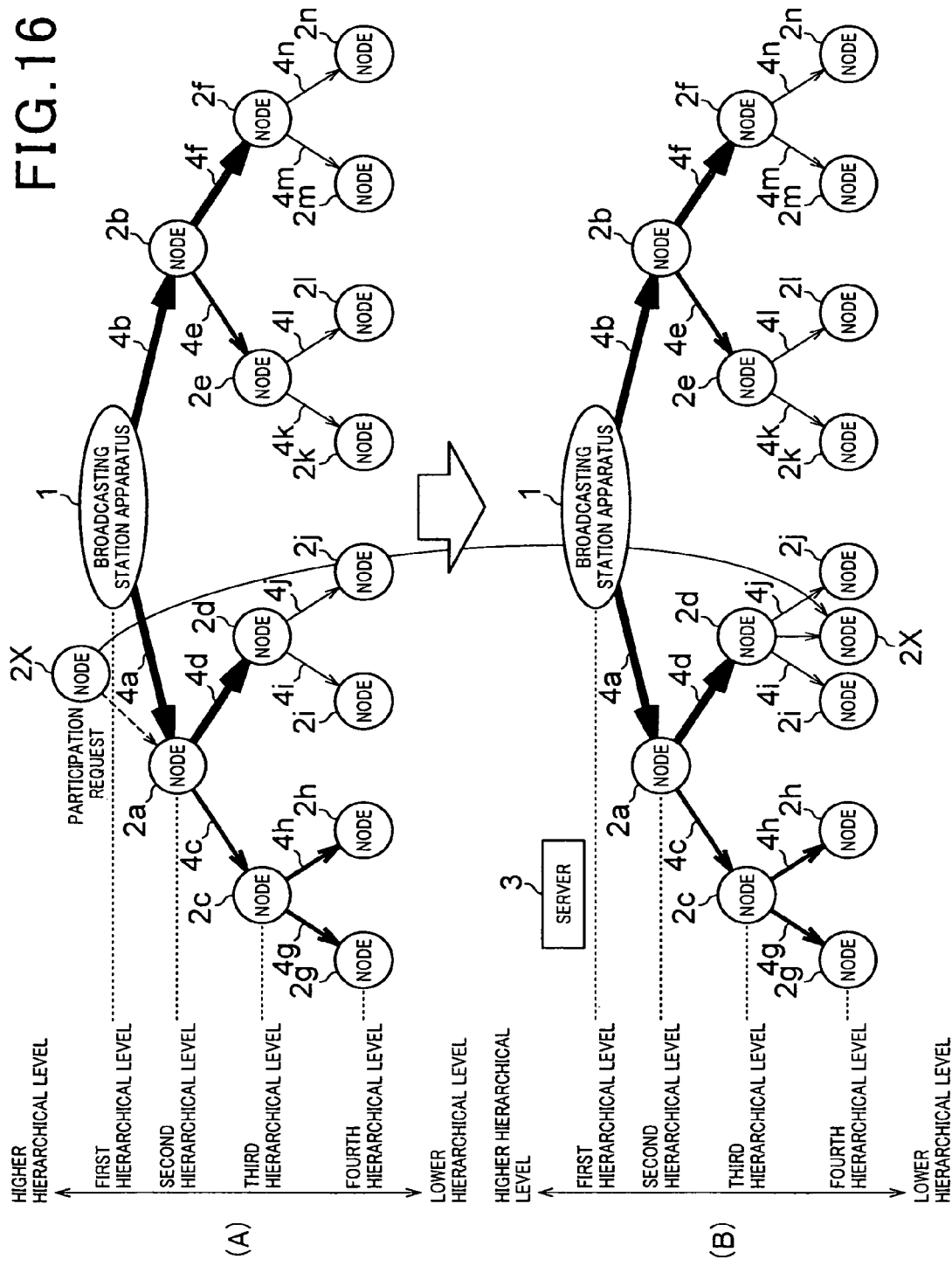
FIG. 16 is a diagram showing a state where the connection mode of the node 2 and the like is autonomously reset when the unparticipating node 2X newly participates in the tree distribution system S.
Figure 17:
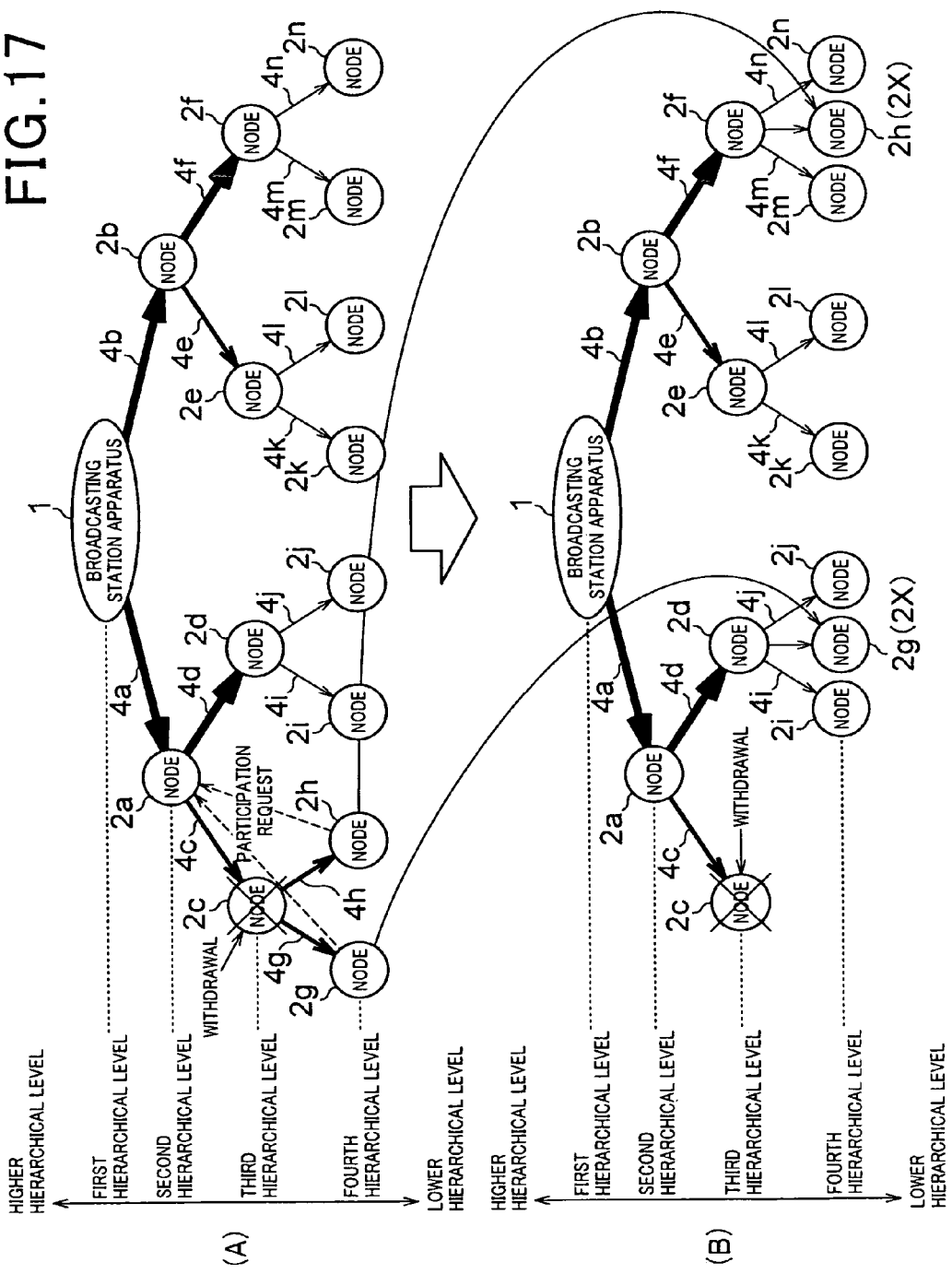
FIG. 17 is a diagram showing a state where the connection mode of the node 2 and the like is autonomously reset when the node 2 positioned at a high hierarchical level withdraws from the tree distribution system S.

FIGS. 14 and 15 are flowcharts showing an example of the connection mode control process in the controller 21 in the node 2 in the case where the tree type distribution system S is reconstructed autonomously. FIG. 16 is a diagram showing a state where the connection mode of the node 2 and the like is autonomously reset in the case where the unparticipating node 2X participates in the tree type distribution system S. FIG. 17 is a diagram showing a state where the connection mode of the node 2 and the like is autonomously reset in the case where the node 2 positioned at a higher hierarchical level withdraws from the tree type distribution system S.

For example, in the case where an unparticipating node X shown in FIG. 16 newly participates in the tree type distribution system S, the unparticipating node 2X transmits participation request information indicative of a request for participating in the tree type distribution system S to an arbitrary node 2a (the self node 2a) via the network 10. For example, the unparticipating node 2X refers to and obtains the IP address of the arbitrary node 2a from the broadcasting station apparatus 1 and the like and transmits the participation request information to the node 2a.

Alternatively, for example, the nodes 2g and 2h which become the unparticipating nodes 2X and cannot receive contents data due to withdrawal of the node 2c positioned at a higher hierarchical level shown in FIG. 17 from the tree type distribution system S for some reason such as power disconnection or failure transmit participation request information indicative of a request for participation in the tree type distribution system S to the node 2a on the basis of the IP address of the node 2a positioned at a level higher by two levels, which is written in the topology management policy.

The participation request information transmitted as described above is received by, for example, the node 2a (self node 2a) (by the participation request information receiving means), and the process shown in FIG. 13 starts.

First, a communication log (log of past communications) of the unparticipating node 2X which has transmitted the participation request information is referred to (step S51), and whether a communication log exists or not is determined (step S52). A communication log includes, for example, information such as the effective bandwidth information.

When there is a communication log (step S52:YES), the effective bandwidth information of the unparticipating node 2X is obtained from the communication log (by the effective bandwidth information obtaining means) (step S53).

On the other hand, when there is no communication log (step S52:NO), for example, self-declaration information (including information such as the line type and the effective bandwidth information) of a network which is set at the time of participation for the first time is obtained from the unparticipating node 2X (by the effective bandwidth information obtaining means) (step S54).

Subsequently, the maximum connection number information and the effective bandwidth information of the broadcasting station apparatus 1 connected at a high hierarchical level, the maximum connection number information and the effective bandwidth information of the self node 2a, and the maximum connection number information and the effective bandwidth information of the node 2 connected at a lower hierarchical level (the nodes 2c and 2d in the case of FIG. 16, and the node 2d in the case of FIG. 17) (except for the case where the node 2 is not connected at a lower hierarchical level) is obtained from the topology management policy (by the effective bandwidth information obtaining means) (step S55).

Next, the effective bandwidth of the communication path 4a attached to the self node 2a is compared with the effective bandwidth of the communication path 4 attached to the unparticipating node 2X (by the effective bandwidth comparing means). It is determined whether or not the effective bandwidth of the communication path 4 attached to the unparticipating node 2X is equal to or less than the effective bandwidth of the communication path 4a attached to the self node 2a (step S56) If it is equal to or less than the effective bandwidth (step S56:YES), that is, in the case where the effective bandwidth of the communication path 4 attached to the unparticipating node 2X is narrower than or equal to the effective bandwidth of the communication path 4a attached to the self node 2a, the system management server 3 moves to step S59.

On the other hand, in the case where the effective bandwidth of the communication path 4 attached to the unparticipating node 2X is not equal to or less than the effective bandwidth of the communication path 4a attached to the self node 2a (step S56:NO), that is, in the case where the effective bandwidth of the communication path 4 attached to the unparticipating node 2X is wider, it is determined whether or not the unparticipating node 2X can be connected at a lower hierarchical level to the broadcasting station apparatus 1 (or the node 2) at the higher hierarchical level to which the node 2a is connected, that is, it is determined whether or not there is a problem in the topology management policy (for example, whether or not the number of connections exceeds the maximum connection number of the broadcasting station apparatus 1) (by the connection determining means) (step S57).

In the case where the unparticipating node 2X can be connected (step S57:YES), that is, in the case where there is no problem in the topology management policy (for example, the number of connections does not exceed the maximum number of connections), the broadcasting station apparatus 1 is set as the connection destination of the unparticipating node 2X (specifically, on the basis of the comparison result, the connection destination is set so that the unparticipating node 2X is positioned at a hierarchical level according to the effective bandwidth of the communication path 4 attached to the unparticipating node 2X by the connection destination setting means). A connection mode table as connection information necessary for connection to the broadcasting station apparatus 1 is generated and transmitted via the network 10 to the unparticipating node 2X which has sent the participation request (by the connection information transmitting means) (step S58), and the process is finished. The connection mode table may be transmitted in response to a request from the unparticipating node 2X. The unparticipating node 2X transmits the connection request information to the broadcasting station apparatus 1 in accordance with the connection mode table (for example, the IP address included in the table), is electrically connected and, for example, obtains the topology management policy from the broadcasting station apparatus 1 (or the self node 2a). In such a manner, for example, the tree type distribution system S is reconstructed.

On the other hand, in the case where it is determined in step S57 that the unparticipating node 2X cannot be connected (step S57:NO), that is, in the case where there is a problem in the topology management policy, the controller 21 advances to step S59.

In step S59, it is determined whether or not the unparticipating node 2X can be connected at a lower hierarchical level of the self node 2a, that is, whether or not there is a problem in the topology management policy or (for example, whether or not the number of connections does not exceed the maximum number of connections of the self nodes 2a) is determined (by the connection determining means).

In the case where it is determined that the unparticipating node 2X can be connected (step S59:YES), that is, there is no problem in the topology management policy (for example, the number of connections does not exceed the maximum number of connections), the self node 2a is set as the connection destination of the unparticipating node 2X (that is, the connection destination is set so as to position at a hierarchical level according to the effective bandwidth of the communication path 4 attached to the unparticipating node 2X on the basis of the comparison result by the connection destination setting means). A connection mode table as connection information necessary for connection to the self node 2a is generated and is transmitted to the unparticipating node 2X which has sent a participation request via the network 10 (by the connection information transmitting means) (step S60), and the process is finished. The connection mode table may be transmitted in response to a request from the unparticipating node 2X. In such a manner, the unparticipating node 2X transmits connection request information to the self node 2a in accordance with the connection mode table (for example, the IP address included in the table) and is electrically connected, and obtains the topology management policy from the self node 2a. According to the topology management policy, for example, the tree type distribution system S is reconstructed.

On the other hand, when it is determined in step S59 that the unparticipating node cannot be connected (step S59:NO), that is, there is a problem in the topology management policy (for example, the number of connections exceeds the maximum connection number), the controller 21 advances to step S61 shown in FIG. 15. The process shown in FIG. 15 is a process for setting the node 2 (in the example of FIG. 16, either the node 2c or 2d) connected at a lower hierarchical level of the self node 2a as the connection destination of the unparticipating node 2X.

In step S61, it is determined whether or not the node 2 is connected at the lower hierarchical level of the self node 2a. In the case where the node 2 is not connected (step S61:NO), for example, a message indicating that the node 2 cannot be connected is notified to the unparticipating node 2X (step S69), and the process is finished.

On the other hand, in the case where the node 2 is connected (step S61:YES), it is determined whether or not a plurality of nodes 2 are connected (step S62). In the case where a plurality of nodes 2 are not connected (step S62:NO), that is, in the case where one node 2 is connected, the one node 2 is set as the connection destination of the unparticipating node 2X (specifically, the connection destination is set so as to be positioned at a hierarchical level according to the effective bandwidth of the communication path 4 attached to the unparticipating node 2X on the basis of the comparison result by the connection destination setting means, which will be similar in the following). The connection mode table as connection information necessary for connection to the node 2 is generated, and transmitted via the network 10 to the unparticipating node 2X which has sent a participation request (by the connection information transmitting means) (step S63), and the process is finished. The connection mode table may be transmitted in response to a request from the unparticipating node 2X.

On the other hand, when a plurality of nodes are connected in step S62 (step S62:YES), it is determined whether or not the effective bandwidths of the communication paths 4 attached to the nodes 2 at the lower hierarchical level are equivalent (for example, within the effective bandwidth in a predetermined range) (step S64). If the effective bandwidths are not equivalent (step S64:NO), one node 2 to which the communication path 4 whose effective bandwidth is the widest is selected from the plurality of nodes 2 at the lower hierarchical level (by the receiving device selecting means). Since the effective bandwidth of the communication path 4d attached to the node 2d is the widest in the example of FIG. 16, the node 2d is selected.

As the connection destination of the unparticipating node 2X, for example, the selected node 2d is set. A connection mode table as connection information necessary for connection to the node 2d is generated and transmitted (by the connection information transmitting means) via the network 10 to the unparticipating node 2X which has sent a participation request (step S65), and the process is finished. The connection mode table may be transmitted in response to a request from the unparticipating node 2X.

On the other hand, when the effective bandwidths are equivalent (step S64:YES), it is determined whether or not there is a transfer log of the participation request information in the recent past (S66). When there is the transfer log (specifically, the participation request information is transferred to the node 2 connected at a lower hierarchical level in the recent past) (step S66:YES), one of nodes 2 to which the participation request information has not been transferred in the past (for example, in the recent past) is selected out of the plurality of nodes 2 at the lower hierarchical level.

As the connection destination of the unparticipating node 2X, the selected node 2 to which the participation request information has not been transferred in the past (for example, in the recent past) is set. A connection mode table as connection information necessary for connection to the node 2 is generated and transmitted via the network 10 to the unparticipating node 2X which has sent the participation request (by the connection information transmitting means) (step S67), and the process is finished. Alternatively, the connection mode table may be transmitted in response to a request from the unparticipating node 2X.

On the other hand, when there is no transfer log in step S66 (step S66:NO), one of the plurality of nodes 2 at the lower hierarchical level is selected at random. As the connection destination of the unparticipating node 2X, the selected node 2 is set. A connection mode table as connection information necessary for connection to the node 2 is generated and transmitted via the network 10 to the unparticipating node 2X which has sent a participation request (by the connection information transmitting means) (step S68), and the process is finished. Alternatively, the connection mode table may be transmitted in response to a request from the unparticipating node 2X.

As described above, the unparticipating node 2X receives the connection mode table transmitted in the step S63, S65, S67, or S68, transmits connection request information to the node 2 connected at a lower hierarchical level of the self node 2a in accordance with the connection mode table (for example, the IP address included in the table), is electrically connected to the node 2, and obtains topology management policy from the node 2 (or the self node 2a). For example, the tree type distribution system S is reconstructed according to the topology management policy.

As described above, also in the case where the system management server 3 for managing the connection mode of the whole tree type distribution system S does not exist, each node 2 sets the connection destination of the unparticipating node 2X so that the unparticipating node 2X is positioned at a hierarchical level according to the effective bandwidth of the communication path attached to the unparticipating node 2X which participates in the system S. Consequently, even when participation/withdrawal to/from the system S repeats and the system S is reconstructed repeatedly, it can be maintained so that a node 2 having relatively high supply capability is positioned at a high hierarchical level, and a node 2 having relatively low supply capability is positioned at a low hierarchical level. Thus, the optimization of the effective bandwidth of the communication path between devices in the system S can be maintained. Therefore, even when the system S is reconstructed repeatedly, the communication performance can be improved over a wide range of the system without exerting an adverse influence on the whole system.

In the steps S58, S63, S65, S67, and S68, the node 2 as the connection destination of the unparticipating node 2X is set by a self device 2aa for performing process, and the connection mode table is transmitted to the unparticipating node 2X. Alternatively, in the steps S58, S63, S65, S67, and S68, the self node 2a as the participation request information transfer means may transfer participation request information from the unparticipating node 2X to the node 2 at a higher or lower hierarchical level of the self node 2a. In this case, the participation request information is received by the node 2 at the higher or lower hierarchical level, and the process shown in FIG. 14 is started by the node 2. In step S67 in this case, the participation request information is transferred with priority on the node 2 to which the participation request information has not been transferred in the past (in the recent past).

Although description has been given to the example where the processes shown in FIGS. 14 and 15 are executed by any of the nodes 2 provided for the tree type distribution system S, the invention is not limited to the case. The system management server 3 or the broadcasting station apparatus 1 may execute the processes shown in FIGS. 14 and 15 to control the connection mode between nodes 2 in the tree type distribution system S or between the broadcasting station apparatus 1 and the node 2. In this case, the participation request information transmitted from the unparticipating node 2X to the system management server 3 or the broadcasting station apparatus 1 includes information indicative of designation (for example, the apparatus ID or IP address) of the node 2 to which the unparticipating node 2X is desired to be connected. The node 2 is positioned at the self node 2a.

The present invention is not limited to the foregoing embodiments. The embodiments are illustrative and anything having substantially the same configuration as that in the technique idea described in the scope of claims of the present invention and producing similar effects are included in the technical scope of the invention.

The present invention is not confined to the configuration listed in the foregoing embodiments, but it is easily understood that the person skilled in the art can modify such configurations into various other modes, within the scope of the present invention described in the claims.

All of the disclosure of Japanese Patent Application No. 2004-217032 including the specification, scope of claims, drawings, and abstract filed on Jul. 26, 2004 is incorporated herein by reference.

What is claimed is:

1. A connection mode setting apparatus for setting a mode of connection among a distributing device for distributing distribution information and a plurality of receiving devices for receiving the distribution information provided in a tree type distribution system in which the distributing device is positioned at the highest hierarchical level, the plurality of receiving devices form a plurality of hierarchical levels, the devices are connected in a tree shape via communication paths, and the distribution information distributed by the distributing device is sequentially transferred from the receiving device at a higher hierarchical level to the receiving device at a lower hierarchical level, the apparatus comprising:
   an effective bandwidth information obtaining unit for obtaining effective bandwidth information indicative of an effective bandwidth of each of the communication paths attached to the receiving devices so that each of the receiving devices is connected to the receiving device or the distributing device at the higher hierarchical level;
   an effective bandwidth comparing unit for comparing the effective bandwidths of the communication paths; and
   a connection mode setting unit for setting a mode of connection among the devices on the basis of a result of comparison of the effective bandwidth comparing unit.

2. The connection mode setting apparatus according to claim 1, wherein the connection mode setting unit sets a mode of connection among the devices so that the receiving device to which the communication path whose effective bandwidth is relatively wide is attached is preferentially positioned at a the higher hierarchical level.

3. The connection mode setting apparatus according to claim 1, wherein the connection mode setting unit sets a mode of connection among the devices so that the number of connections of the other receiving devices connected at the lower hierarchical level of the distributing device or one receiving device is smaller than a predetermined number of connections.

4. The connection mode setting apparatus according to claim 3, wherein, in the case where the effective bandwidth of the communication path attached to the one receiving device is divided by total number of the other receiving devices connected at the lower hierarchical level of the receiving device and is shared, the predetermined number of connections is determined so that the effective bandwidth exceeds the minimum effective bandwidth which is specified in advance.

5. The connection mode setting apparatus according to claim 1, wherein the connection mode setting unit further sets a mode of connection among the devices so that the number of hierarchical levels formed by the plurality of receiving devices is smaller than a predetermined number of levels.

6. The connection mode setting apparatus according to claim 1, further comprising a participation request information receiving unit for receiving participation request information indicative of a participation request transmitted from a new receiving device to participate in the tree type distribution system,
   wherein the effective bandwidth information obtaining unit obtains effective bandwidth information indicative of an effective bandwidth of a communication path attached to the new receiving device so that the new receiving device which has transmitted the participation request information is connected to the receiving device or the distributing device at the higher hierarchical level,
   the effective bandwidth comparing unit compares effective bandwidth of the communication path attached to the new receiving device with effective bandwidth of the communication path attached to at least one receiving device other than the new receiving device, and
   the connection mode setting unit sets a connection destination of the new receiving device so that the new receiving device is positioned at a hierarchical level according to the effective bandwidth of the communication path attached to the new receiving device on the basis of a result of comparison by the effective bandwidth comparing unit.

7. The connection mode setting apparatus according to claim 6, wherein the connection mode setting unit further sets a connection destination of the new receiving device so that the number of connections of the other receiving devices connected at a hierarchical level lower than the distributing device or the one receiving device as a connection destination of the new receiving device becomes smaller than a predetermined number of connections.

8. The connection mode setting apparatus according to claim 7, wherein, in the case where the effective bandwidth of the communication path attached to the one receiving device is divided by total number of the other receiving devices connected at the lower hierarchical level of the receiving device and is shared, the predetermined number of connections is determined so that the effective bandwidth exceeds the minimum effective bandwidth which is specified in advance.

9. The connection mode setting apparatus according to claim 6, wherein the connection mode setting unit further sets a connection destination of the new receiving device so that the number of hierarchical levels formed by the plurality of receiving devices becomes smaller than a predetermined number of levels.

10. The connection mode setting apparatus according to claim 6, further comprising a connection information transmitting unit for transmitting, to the new receiving device, connection information necessary for connection to the distributing device or the one receiving device as the set connection destination of the new receiving device.

11. The connection mode setting apparatus according to claim 6, wherein the new receiving device is the receiving device which becomes unable to receive the distribution information due to withdrawal of the receiving device positioned at the higher hierarchical level from the tree type distribution system.

12. The connection mode setting apparatus according to claim 1, wherein the effective bandwidth of the communication path is calculated on the basis of time required for data transmitted from one of the devices to be received by the other device via the communication path.

13. A connection mode control apparatus for controlling a mode of connection between at least two devices among a distributing device for distributing distribution information and a plurality of receiving devices for receiving the distribution information provided in a tree type distribution system in which the distributing device is positioned at the highest hierarchical level, the plurality of receiving devices form a plurality of hierarchical levels, the devices are connected in a tree shape via communication paths, and the distribution information distributed by the distributing device is sequentially transferred from the receiving device at a higher hierarchical level to the receiving device at a lower hierarchical level, the apparatus comprising:
- a participation request information receiving unit for receiving participation request information indicative of a participation request transmitted from a new receiving device to participate in the tree type distribution system;
- an effective bandwidth information obtaining unit for obtaining effective bandwidth information indicative of an effective bandwidth of the communication path attached to the new receiving device so that the new receiving device which has transmitted the participation request information is connected to the receiving device or the distributing device at the higher hierarchical level of the new receiving device, and effective bandwidth information indicative of an effective bandwidth of the communication path attached to the new receiving device so that at lest one receiving device other than the new receiving device is connected to the receiving device or the distributing device at the higher hierarchical level;
- an effective bandwidth comparing unit for comparing the effective bandwidth of the communication path attached to the new receiving device with the effective bandwidth of the communication path attached to at least one of the receiving devices other than the new receiving device; and
- a connection destination setting unit for setting a connection destination of the new receiving device on the basis of a result of comparison of the effective bandwidth comparing unit so that the new receiving device is positioned at a hierarchical level according to the effective bandwidth of the communication path attached to the new receiving device.

14. The connection mode control apparatus according to claim 13, wherein the connection destination setting unit further sets a connection destination of the new receiving device so that the number of connections of the other receiving devices connected at the lower hierarchical level of the distributing device or one receiving device, which is the connection destination of the new receiving device, becomes smaller than a predetermined number of connections.

15. The connection mode control apparatus according to claim 14, wherein, in the case where the effective bandwidth of the communication path attached to the one receiving device is divided by total number of the other receiving devices connected at the lower hierarchical level of the receiving device and is shared, the predetermined number of connections is determined so that the effective bandwidth exceeds the minimum effective bandwidth which is specified in advance.

16. The connection mode control apparatus according to claim 13, wherein the connection destination setting unit further sets a connection destination of the new receiving device so that the number of hierarchical levels formed by the plurality of receiving devices becomes smaller than a predetermined number of levels.

17. The connection mode control apparatus according to claim 13, further comprising a connection information transmitting unit for transmitting, to the new receiving device, connection information necessary for connection to the distributing device or one of the receiving devices as the set connection destination of the new receiving device.

18. The connection mode control apparatus according to claim 13, wherein the new receiving device is the receiving device which becomes unable to receive the distribution information due to withdrawal of the receiving device positioned at the higher hierarchical level from the tree type distribution system.

19. The connection mode control apparatus according to claim 13, wherein the effective bandwidth of the communication path is calculated on the basis of time required for data transmitted from one of the devices to be received by the other device via the communication unit.

20. The connection mode control apparatus according to claim 13, further comprising a connection determining unit for, in the case where effective bandwidth of a communication path attached to the new receiving device is wider than effective bandwidth of the communication path attached to one receiving device other than the new receiving device, for determining whether or not the new receiving device can be connected at the lower hierarchical level of the receiving device or the distributing device at the higher hierarchical level to which the one receiving device is connected on the basis of a result of comparison of the effective bandwidth comparing unit.

21. The connection mode control apparatus according to claim 20, wherein, in the case where the connection determining unit determines that the new receiving device can be connected, the connection destination setting unit sets the receiving device or the distributing device at the higher hierarchical level to which the one receiving device is connected as the connection destination of the new receiving device.

22. The connection mode control apparatus according to claim 20, wherein, in the case where the connection determining unit determines that the new receiving device cannot be connected, the connection destination setting unit further determines whether or not the new receiving device can be connected at a hierarchical level lower than the one receiving device.

23. The connection mode control apparatus according to claim 13, further comprising a connection determining unit for, in the case where the effective bandwidth of the communication path attached to the new receiving device is narrower than that of the communication path attached to the one receiving device other than the new receiving device, determining whether or not the new receiving device can be connected at the lower hierarchical level of the one receiving device on the basis of a result of the comparison of the effective bandwidth comparing unit.

24. The connection mode control apparatus according to claim 22, wherein, in the case where the connection determining unit determines that the new receiving device can be connected, the connection destination setting unit sets the one receiving device as the connection destination of the new receiving device.

25. The connection mode control apparatus according to claim 22, wherein, in the case where the connection determining unit determines that the new receiving device cannot be connected, the connection destination setting unit sets, as the connection destination of the new receiving device, that the new receiving device is connected at the lower hierarchical level of the one receiving device.

26. The connection mode control apparatus according to claim 22, further comprising a receiving device selecting unit for determining whether or not there are a plurality of receiving devices to be connected at the lower hierarchical level of the one receiving device, and in the case where there are a plurality of receiving devices, selecting a receiving device attached to the communication path whose effective bandwidth is the widest from the plurality of receiving devices, wherein, in the case where the connection determining unit determines that the new receiving device cannot be connected, the connection destination setting unit sets the selected receiving device as the connection destination of the new receiving device.

27. The connection mode control apparatus according to claim 13, wherein the connection mode control apparatus is included in the distributing device.

28. The connection mode control apparatus according to claim 13, wherein the connection mode control apparatus is included in the one receiving device.

29. The connection mode control apparatus according to claim 22, wherein the connection mode control apparatus is included in the first receiving device, and further comprises a participation request information transfer unit for, in the case where the connection determining unit determines that the new receiving device cannot be connected, transferring the participation request information to any one of receiving devices except for the one receiving device and the new receiving device in place of setting the connection destination of the new receiving device.

30. The connection mode control apparatus according to claim 29, wherein the participation request information transfer unit transfers the participation request information with priority on the receiving device to which the participation request information has not been transferred before.

31. A connection mode setting method for setting a mode of connection among a distributing device for distributing distribution information and a plurality of receiving devices for receiving the distribution information provided in a tree type distribution system in which the distributing device is positioned at the highest hierarchical level, the plurality of receiving devices form a plurality of hierarchical levels, the devices are connected in a tree shape via communication paths, and the distribution information distributed by the distributing device is sequentially transferred from the receiving device at a higher hierarchical level to the receiving device at a lower hierarchical level, the method comprising:
 a step of obtaining effective bandwidth information indicative of an effective bandwidth of each of the communication paths attached to the receiving devices so that each of the receiving devices is connected to the receiving device or the distributing device at the higher hierarchical level;
 a step of comparing the effective bandwidths of the communication paths; and
 a step of setting a mode of connection among the devices on the basis of a result of comparison of the effective bandwidth.

32. A connection mode control method for controlling a mode of connection between at least two devices among a distributing device for distributing distribution information and a plurality of receiving devices for receiving the distribution information provided in a tree type distribution system in which the distributing device is positioned at the highest hierarchical level, the plurality of receiving devices form a plurality of hierarchical levels, the devices are connected in a tree shape via communication paths, and the distribution information distributed by the distributing device is sequentially transferred from the receiving device at a higher hierarchical level to the receiving device at the lower hierarchical level, the method comprising:
 a step of receiving participation request information indicative of a participation request transmitted from a new receiving device to participate in the tree type distribution system;
 a step of obtaining effective bandwidth information indicative of an effective bandwidth of the communication path attached to the new receiving device so that the new receiving device which has transmitted the participation request information is connected to the receiving device or the distributing device at the higher hierarchical level of the new receiving device, and effective bandwidth information indicative of an effective bandwidth of the communication path attached to the new receiving device so that at lest one receiving device other than the new receiving device is connected to the receiving device or the distributing device at the high hierarchical level;
 a step of comparing the effective bandwidth of the communication path attached to the new receiving device with the effective bandwidth of the communication path attached to at least one of the receiving devices other than the new receiving device; and
 a step of setting a connection destination of the new receiving device on the basis of a result of comparison of the effective bandwidth so that the new receiving device is positioned at a hierarchical level according to the effective bandwidth of the communication path attached to the new receiving device.

33. A recording medium for recording a connection mode setting program for a computer for setting a mode of connection among a distributing device for distributing distribution information and a plurality of receiving devices for receiving the distribution information provided in a tree type distribution system in which the distributing device is positioned at the highest hierarchical level, the plurality of receiving devices form a plurality of hierarchical levels, the devices are connected in a tree shape via communication paths, and the distribution information distributed by the distributing device is sequentially transferred from the receiving device at a higher hierarchical level to the receiving device at a low hierarchical level, the program causing the computer to function as:
 an effective bandwidth information obtaining unit for obtaining effective bandwidth information indicative of an effective bandwidth of each of the communication paths attached to the receiving devices so that each of the receiving devices is connected to the receiving device or the distributing device at the higher hierarchical level;
 an effective bandwidth comparing unit for comparing the effective bandwidths of the communication paths; and
 a connection mode setting unit for setting a mode of connection among the devices on the basis of a result of comparison of the effective bandwidth comparing unit.

34. A recording medium for recording a connection mode control program for a computer for controlling a mode of connection between at least two devices among a distributing device for distributing distribution information and a plurality of receiving devices for receiving the distribution information provided in a tree type distribution system in which the distributing device is positioned at the highest hierarchical level, the plurality of receiving devices form a plurality of hierarchical levels, the devices are connected in a tree shape via communication paths, and the distribution information distributed by the distributing device is sequentially transferred from the receiving device at a higher hierarchical level to the receiving device at a lower hierarchical level, the program causing the computer to function as:

a participation request information receiving unit for receiving participation request information indicative of a participation request transmitted from a new receiving device to participate in the tree type distribution system;

an effective bandwidth information obtaining unit for obtaining effective bandwidth information indicative of an effective bandwidth of the communication path attached to the new receiving device so that the new receiving device which has transmitted the participation request information is connected to the receiving device or the distributing device at the higher hierarchical level of the new receiving device, and effective bandwidth information indicative of an effective bandwidth of the communication path attached to the new receiving device so that at lest one receiving device other than the new receiving device is connected to the receiving device or the distributing device at the higher hierarchical level;

an effective bandwidth comparing unit for comparing the effective bandwidth of the communication path attached to the new receiving device with the effective bandwidth of the communication path attached to at least one of the receiving devices other than the new receiving device; and a connection destination setting unit for setting a connection destination of the new receiving device on the basis of a result of comparison of the effective bandwidth comparing unit so that the new receiving device is positioned at a hierarchical level according to the effective bandwidth of the communication path attached to the new receiving device.

* * * * *